(12) United States Patent
Auchterlonie

(10) Patent No.: US 7,634,042 B2
(45) Date of Patent: Dec. 15, 2009

(54) PULSED POWER SYSTEM INCLUDING A PLASMA OPENING SWITCH

(76) Inventor: Richard Auchterlonie, 10022 Briar Dr., Houston, TX (US) 77042

( * ) Notice: Subject to any disclaimer, the term of this patent is extended or adjusted under 35 U.S.C. 154(b) by 623 days.

(21) Appl. No.: 10/599,251

(22) PCT Filed: Mar. 23, 2005

(86) PCT No.: PCT/US2005/009723

§ 371 (c)(1),
(2), (4) Date: Sep. 22, 2006

(87) PCT Pub. No.: WO2005/094502

PCT Pub. Date: Oct. 13, 2005

(65) Prior Publication Data

US 2008/0237499 A1     Oct. 2, 2008

Related U.S. Application Data

(60) Provisional application No. 60/555,937, filed on Mar. 24, 2004.

(51) Int. Cl.
*H05H 1/16*     (2006.01)
(52) U.S. Cl. .............. 376/141; 376/144; 376/142; 376/143; 315/111.51; 315/111.41; 315/290; 315/291
(58) Field of Classification Search ............ 376/121, 376/141–145; 315/111.21, 111.41, 111.51, 315/246, 248, 290, 291, 344
See application file for complete search history.

(56) References Cited

U.S. PATENT DOCUMENTS

| | | | |
|---|---|---|---|
| 4,346,420 A | 8/1982 | Turchi | 361/4 |
| 4,396,867 A | 8/1983 | Turchi et al. | 315/111.41 |
| 4,397,147 A | 8/1983 | Turchi | 60/202 |
| 4,422,013 A | 12/1983 | Turchi et al. | 315/111.81 |

(Continued)

FOREIGN PATENT DOCUMENTS

WO     WO 99/23735     5/1999

OTHER PUBLICATIONS

B. Freeman et al., "Plasma Focus Experiments Powered by Explosive Generators," Los Alamos National Laboratory, LA-UR—83-1083, Los Alamos, NM, 1983. (28 pages).

(Continued)

*Primary Examiner*—Haissa Philogene
(74) *Attorney, Agent, or Firm*—Richard Auchterlonie

(57) ABSTRACT

A pulsed power system has an inductive energy storage circuit (42) including a current source (43) and a plasma opening switch (44). The plasma opening switch has a transmission line (51, 52) coupling the current source to a load (41). The plasma opening switch changes from a closed state to an open state when a plasma discharge (45) in the plasma opening switch is driven by magnetic force from a first region along the transmission line to a second region towards the load. Electrical conductors (47, 48) are arranged for providing a stabilizing magnetic field configuration in the first region to magnetically latch the plasma discharge in the first region during charging of the inductive energy storage circuit, and current flowing along the transmission line from the current source to the load tends to disrupt the stabilizing magnetic field configuration and unlatch the plasma discharge from the first region and drive the plasma discharge toward the second region.

23 Claims, 25 Drawing Sheets

U.S. PATENT DOCUMENTS

| | | | | |
|---|---|---|---|---|
| 4,446,096 | A | 5/1984 | Auchterlonie | 376/145 |
| 4,485,314 | A | 11/1984 | Turchi | 307/308 |
| 4,596,945 | A * | 6/1986 | Schumacher et al. | 315/344 |
| 4,812,715 | A | 3/1989 | Mendel | 315/340 |
| 4,841,217 | A | 6/1989 | Weldon et al. | 322/8 |
| 4,912,738 | A | 3/1990 | Turchi | 378/121 |
| 4,918,325 | A | 4/1990 | Busby et al. | 307/106 |
| 5,008,798 | A * | 4/1991 | Harvey | 363/59 |
| 5,048,068 | A | 9/1991 | Turchi | 378/121 |
| 5,210,452 | A | 5/1993 | Pratap et al. | 310/12 |
| 5,329,205 | A | 7/1994 | Goebel et al. | 315/111.21 |
| 5,766,337 | A | 6/1998 | Moon | 106/690 |
| 5,835,545 | A | 11/1998 | Turchi | 376/145 |
| 6,304,042 | B1 | 10/2001 | Savage et al. | 315/340 |
| 6,566,667 | B1 * | 5/2003 | Partlo et al. | 250/504 R |

OTHER PUBLICATIONS

Sing Lee and Adrian Serban, "Dimensions and Lifetime of the Plasma Focus Pinch," IEEE Transactions on Plasma Science, vol. 24, No. 3, Jun. 1996, pp. 1101-1105.

Jorge Pouzo, "Applications of the Dense Plasma Focus to Nuclear Fusion and Plasma Astrophysics," IEEE Transactions on Plasma Science, vol. 31, No. 6, Dec. 2003, pp. 1237-1241.

E.B. Hooper, et al., "The Spheromak Path to Fusion Energy," Lawrence Livermore National Laboratory, UCRL-ID-130429, Apr. 1998, 30 pages.

E. V. Grabovsky, et al., "Development of X-Ray Facility 'Baikal' Based on 800 MJ Inductive Store and Related Problems," Pulsed Power Plasma Science, vol. 1, 2001, pp. 773-776, Institute of Electrical and Electronic Engineers, New York, NY.

G. I. Dolgachev, et al., "Increase of plasma opening switch conduction phase duration," Pulsed Power Plasma Science, vol. 2, 2001, pp. 1455-1457, Institute of Electrical and Electronic Engineers, New York, NY.

G. I. Dolgachev, et al., "Parallel POS Synchronization and Current Transfer to the Load," $30^{th}$ EPS Conference on Contr. Fusion and Plasma Phys., St. Petersburg, Jul. 7-11, 2003 ECA vol. 27A, P-3.56, 4 pages.

C. M. Fowler, "Megagauss X: A Conference Milestone," Megagauss-X Conference, Opening Remarks, Berlin, Germany, Jul. 18-23, 2004, 7 pages.

J. P. Chittenden, "The Z-pinch approach to fusion," Physics World, May 2000, pp. 39-43.

W.M. Parsons, "The Atlas Project," Los Alamos National Laboratory, LA-UR-96-3440, Feb. 11, 1997, 9 pages.

R.W. Bray, et al., "Final Commissioning of the Balcones 60 MJ Pulsed Power Supply," IEEE Transactions on Magnetics, vol. 27, No. 1, Jan. 1991, pp. 433-437.

C. Jiang, et al., "Small BLT Switches for Compact Pulsed Power Applications," 2005 IEEE Pulsed Power Conference, Monterey, CA, Jun. 13-17, 2005, 3 pages.

K. I. Thomassen, et al , "Pulsed Energy Storage in Fusion Devices," Los Alamos Scientific Laboratory, LA-UR-76-1837, Sixth IAEA Conference, Berchtesgaden, Germany, Oct 6-13, 1976, 10 pages.

International Search Report and the Written Opinion of the International Searching Authority, PCT/US2005/09723, United States Patent and Trademark Office, Arlington, VA, Sep. 6, 2006, 11 pages.

G. D. Roy, "High Power, High Repetition Rate Switches: An Overview," Office of Naval Research, United States Navy, Naval Research Review, vol. 2, 1990, p. 17-24.

*Plasmas and Fluids, Physics Through the 1990s*, Physics Survey Committee, National Research Council, National Academy Press, Washington, D.C., 1986, pp. 100-101.

Matthew T. Domonkos, "Increased PRF for Pulsed Power," SITIS Topic No. OSD05-D05, OSD, United States Air Force, dodsbir.net, printed Aug. 16, 2005, 3 pages.

"Plasma Switches for High-Repetition, High-Power Applications," SITIS Topic No. AF05-198, United States Air Force, printed Aug. 16, 2005, 3 pages.

Velikovich et al., "Z-Pinch Plasma Neutron Sources," DE-AC04-94-AL85000, Proj-2480M Report No. AD-A446151; NRL/MR/6720—06-8927, Naval Research Laboratory, Washington, D.C., Mar 24, 2006; 54 pages.

Yousry Gohar, "Fusion Solution to Dispose of Spent Nuclear Fuel, Transuranic Elements, and Highly Enriched Uranium," Report ANL/TD/CP-102732, Argonne National Laboratory, Argonne, IL, Proceedings of the 21st Symposium on Fusion Technology (SOFT-21), Madrid, Spain, Sep. 11-15, 2000, 6 pages.

Mazarakis & Olson, "A New High Current Fast 100ns LTD Based Driver for Z-pinch IFE at Sandia," Sandia National Laboratory, Albuquerque, NM, presented at Twenty-First IEEE/NPSS Symposium on Fusion Engineering 2005, Knoxville, TN, Sept. 26-29, 2005, 4 pages.

Sincerny et al., "Falcon: An Inductive Store/Opening Switch X-ray Simulator Test Bed," Physics International Corp., San Lendro, CA, Proc. 7th IEEE Pulsed Power Conf, , Monterey, CA, Jun. 11-14, 1989, p. 696-698.

M. E. Savage, "Final Results From The High-Current, High-Action Closing Switch Test Program at Sandia National Laboratories," SAND98-2818C, Sandia National Laboratories, Albuquerque NM, Jul 13, 1999, 6 pages.

K. W. Chu and G. L. Scott, "A Comparison of High-Voltage Switches," SAND99-0154, Sandia National Laboratories, Albuquerque NM, Feb. 1999, 5 pages.

Savage et al., "Design and Experimental Results on a Terawatt Magnetically Controlled Plasma Opening Swithc," SAND98-0704, Sandia National Laboratories, Albuquerque, NM, May 1998, 66 pages.

Savage et al., "Design of a Command-Triggered Plasma Opening Switch for Terawatt Applications," IEEE Transactions on Plasma Science, vol. 28, No. 5, Oct. 2000, IEEE, Piscataway, NJ, pp. 1533-1539.

Jackson et al., "Overview of recent results from the triggered plasma opening switch experiment," The 31st IEEE International Conference on Plasma Science, Baltimore, MD, Jun. 28-Jul. 1, 2004, IEEE, Piscataway, NJ, p. 372.

Ribe et al., "Feasibility Study of a Pulsed Thermonuclear Reactor," LA-3294-MS, Los Alamos Scientific Laboratory, Los Alamos, NM, May 20, 1965, 59 pages.

"Review of Controlled Thermonuclear Research At Los Alamos," LA-3253-MS, Los Alamos Scientific Laboratory, Los Alamos, NM, Aug. 17, 1965, 221 pages.

Zucker et al., "The Design of a Repetitively Pulsed Megajoule Dense-Plasma Focus," UCRL-51872, Lawrence Livermore Laboratory, Livermore, CA, Aug 1, 1975, 60 pages.

O. S. Zucker, "General Considerations of Energy Compression," UCRL-80047, Lawrence Livermore Laboratory, Livermore, CA, Oct. 1997, presented to Seminar on Energy Storage, Compression and Switching, Canberra, Australia, Nov. 15-21, 1997, 11 pages.

Kitzmiller et al., "Single and Multiphase Compulsator System Architectures: a Practical Comparison," The University of Texas at Austin Center for Electromechanics, Austin, Texas, Dec. 21, 1999, U.S. Army Contract DAAA21-92-C-0105, 6 pages.

T. K. Fowler, "Gun Requirements to Achieve High Field Spheromak," UCRL-ID-133245, Lawrence Livermore National Laboratory, Livermore, CA, Mar. 4, 1999, 14 pages.

Woodruff et al., "Processes that Govern Helicity Injection in the SSPX Spheromak," UCRL-JC-149718, Lawrence Livermore National Laboratory, Livermore, CA, presented at the US-Japan CT Workshop, Osaka, Japan, Sep. 9-11, 2002, 7 pages.

Woodruff et al., "Route to high temperatures by current amplification in the Sustained Spheromak Physics Experiment (SSPX)," Lawrence Livermore National Laboratory, Livermore, CA, presented at the $29_{th}$ EPS Conference on Plasma Physics and Controlled Fusion, Montreux, Switzerland, Jun. 17-21, 2002 ECA vol. 26B, P-5.047 (2002), 4 pages.

Sovinec et al., "Spheromak energy confinement in sustained and transient conditions," The 31st IEEE International Conference on Plasma Science, Wisconsin Univ., Madison, WI, ICOPS 2004, Jun. 28-Jul. 1, 2004, IEEE, Piscataway, NJ, p. 159.

P. J. Turchi, "Prospects for Pulsed Power Above Ten Megampers," 12th IEEE International Pulsed Power Conference, Monterey, CA Jun. 26-27, 1999, IEEE, Piscataway, NJ, vol. 1, pp. 3-7.

P. L. Mondino, "The ITER Pulsed Power Supply System," Fusion Engineering, 1997, 17th IEEE/NPSS Symposium, San Diego, CA, Oct. 6-10, 1997, IEEE, Piscataway, NJ, vol. 1, pp. 491-496.

Walls et al., "Very high-voltage, ultra-high power density, rotating electrical machines as compact pulsed power supplies," Pulsed Power Plasma Science, 2001, vol. 2, pp. 1551-1554.

Kitzmiller et al., "An application guide for compulsators," IEEE Transactions on Magnetics, vol. 39, Issue 1, Part 1, Jan 2003, IEEE, Piscataway, NJ, pp. 285-288.

Williams et al., "Generation IV Roadmap Activity Description of Generation IV Reactor and Fuel Cycle Molten Salt Reactors (MSRs) for Production of Electricity with Fissile, Fertile, and Fission Products Dissolved in a Fluoride Salt," Oak Ridge National Laboratory, Oak Ridge TN, Apr. 25, 2001, 6 pages.

J. Barber & D. Bauer, "Switching for electric rail guns," IEEE Transactions on Magnetics, vol. MAG-20, No. 2, Mar. 1984, IEEE, Piscataway, NJ, pp. 304-307.

Zowarka et al., "A new approach to a high efficiency inductive store," IEEE Transactions on Magnetics, vol. 27, No. 1, Jan 1991, IEEE, Piscataway, NJ, pp. 384-389.

E. van Dijk, "Experimental results obtained with the 1 MA resonant series counterpulse opening switch system, developed at TNO," 1997 11th IEEE International Pulsed Power Conference, Baltimore, MA, Jun. 29-Jul. 2, 1997, IEEE, Piscataway, NJ, vol. 1, pp. 287-292.

Kukushkin, et al., "On the plasma-focus-produced spheromak for the D-3He-fusion-based jet propulsion," Fusion Engineering (SOFE '95) IEEE/NPSS Symposium, Champaign, IL, Sep. 30-Oct. 5, 1995, IEEE, Piscataway, NJ, vol. 2, pp. 1490-1493.

Sahlin et al., "The Plasma Focus as a Pulsed Power Source," Lawrence Livermore Laboratory, Proceedings of the International Topical Conference on Electron Beam Research & Technology, Nov. 3-5, 1975, Albuquerque, NM, 34 pages.

H. de B. Knight, The Arc Discharge, Chapman & Hall Ltd., London, England, 1960, pp. 10-11 and 58-61.

G. R. Jones, High Pressure Arcs in Industrial Devices, Cambridge University Press, Cambridge, England, 1988, pp. 4-6.

Lindemuth et al., "Megagauss Technology and Pulsed Power Applications," LA-UR-96-2830, Los Alamos National Lab., Sep. 1, 1996, 18 pages.

Bowers et al., "Plasma Flow Switch Characterization For the Los Alamos Foil Implosion Project," LA-UR-89-2169, Los Alamos National Laboratory, Los Alamos, NM, Presented at the Fifth International Conference on Magagauss Magnetic Field Generation and Related Topics, Novostbirsk, USSR, Jul. 4-7, 1989, 12 pages.

Benage et al., "The Plasma Flow Switch Experiment on Procyon," LA-UR-95-2552, Los Alamos National Laboratory, Los Alamos, NM, Presented at the $10^{th}$ IEEE International Pulsed Power Conference, Albuquerque, NM, Jul. 10-13, 1995, IEEE, Piscataway, NJ, 8 pages.

Guenther et al., editors, Opening Switches, Plenum Press, New York, NY, 1987, pp. 204-206, 300.

Lee et al., "Plasma Flow Switch Experiments on the Pegasus Facility," LA-UR-91-1983, Los Alamos National Laboratory, Los Alamos, NM, presented at the IEEE Pulsed Power Conference, San Diego, CA, Jun. 17-19, 1991, IEEE, Piscataway, NJ, 4 pages.

E. M. Honig, "Progress in Developing Repetitive Pulse Systems Utilizing Inductive Energy Storage," LA-UR-83-1585, Los Alamos National Laboratory, Los Alamos, NM, Presented at the $4^{th}$ IEEE Pulsed Power Conference, Albuquerque, NM, Jun. 6-8, 1983, IEEE, Piscataway, NJ, 5 pages.

Peterkin et al., "A Long Conduction Time Compact Torus Plasma Opening Switch," IEEE Transactions on Plasma Science, vol. 21, No. 5, Oct. 1993, IEEE, Piscataway, NJ, pp. 522-528.

Wysocki et al., "Plasma Gate Switch Experiment on Pegasus II," LA-UR-95-2553, Los Alamos National Laboratory, Los Alamos, NM, Presented at $10^{th}$ IEEE Pulsed Power Conference, Albuquerque, NM, Jul. 10-13, 1995, IEEE, Piscataway, NJ, 8 pages.

Kagei et al., "MHD Simulation of Current Drive by Repetitive Plasmoid Injection in Helicity-Driven Spheromaks," Journal of Plasma and Fusion Research, vol. 79, No. 3, Mar. 2003, pp. 217-218.

Eugene L. Neau, "High Average Power, High Current Pulsed Accelerator Technology," Sandia National Laboratories, Albuquerque, NM, presented at the IEEE 1995 Particle Accelerator Conference, Dallas, TX, May 1-5, 1995, IEEE, Piscataway, NJ, Proceedings vol. 2, pp. 1188-1192.

Peterson et al., "Comparison and Analysis of 2-D Simulation Results With Two Implosion Radiation Experiments on the Los Alamos Pegasus I and Pegasus II Capacitor Banks," LA-UR-95-2436, Los Alamos National Laboratory, Los Alamos, NM, presented at the IEEE Pulsed Power Conference, Albuquerque, NM, Jul. 10-13, 1995, IEEE, Piscataway, NJ, 7 pages.

Goforth et al., "Procyon High Explosive Pulsed Power Experiments," LA-UR-96-2626, Los Alamos National Laboratory, Los Alamos, NM, presented at the $7^{th}$ International Conference on Megagauss Magnetic Field Generation and Related Topics, Sarov (Arzamas-16), Russia, Aug. 5-10, 1996, 14 pages.

Shpitalnik et al., "Observations of two-dimensional magnetic field evolution in a plasma opening switch," Physics of Plasmas, vol. 5, No. 3, Mar. 1998, pp. 792-798.

T. Intrator, "Magnetized Target Fusion Collaboration 2004: Recent Progress," LA-UR-04-2578, Los Alamos National Laboratory, Los Alamos, NM, presented at the Innovative Confinement Concepts Workshop, Madison, WI, May 25-28, 2004, 35 pages.

Sheehay et al., "Computational Modeling of Pulsed-Power-Driven Magnetized Target Fusion Experiments," LA-UR-95-2365, Los Alamos National Laboratory, Los Alamos, NM, presented at the Tenth IEEE International Conference on Pulsed Power, Albuquerque, NM, Jul. 10-13, 1995, IEEE, Piscataway, NJ, 7 pages.

Craig L. Olson, "Progress on Z-Pinch Inertial Fusion Energy," Sandia National Laboratories, Albuquerque, NM, presented at the $20^{th}$ IAEA Fusion Energy Conference, Vilamoura, Portugal, Nov. 1-6, 2004, 27 pages.

R. E. Reinovsky and C.A. Ekdahl, "Development of Imploding Liners with Kinetic Energies > 100 MJ and Their Applications," LA-UR-96-3962, Los Alamos National Laboratory, Los Alamos, NM, presented at the $7^{th}$ International Conference on Megagauss Magnetic Field Generation and Related Topics, Sarov (Arzamas-16), Russia, Aug. 5-10, 1996, 13 pages.

Baker et al., "30 Years of Pulsed Power R&D in AFRL Kirtland's Building 322," United States Air Force Research Laboratory, presented at the Sixth Annual Directed Energy Professional Society Symposium, Albuquerque, NM, Oct. 23, 2003, 22 pages.

F. J. Wessel and N. Rostoker, "Controlled Thermonuclear Fusion in a Staged Z-Pinch," DE-FG03-93ER54220, University of California, Irvine, CA, Mar. 30, 2000, 69 pages.

"Maxwell Drawn Metal Can High Voltage Capacitors," General Atomics Electronic Systems Inc., San Diego, CA, 2003, 2 pages.

"CKE Silicon Carbide Suppressor Disks," SEMTEX, 400 West Cummings Park Woburn, MA, printed Oct. 28, 2006, 3 pages.

Samuel J. Barish, "U.S. Fusion Energy Sciences Program, Southwestern Region Universities," U.S. Department of Energy Office of Fusion Energy Sciences, Oct. 26, 2005, 16 pages.

John Willis, "Bringing a Star to Earth," U.S. Department of Energy Office of Fusion Energy Sciences, presentation at NASA's Goddard Space Flight Center, Greenbelt, MD, Jan. 24, 2005, 43 pages.

"Green Light for Nuclear Fusion Project," NewScientist.com, Haywards Heath, UK, Nov. 21, 2006, 2 pages.

"ITER and the Future," Frequently Asked Questions and their answers Part 4, jet.efda.org, EFDA-JET, Culham Science Centre, Abingdon, Oxfordshire, United Kingdom, printed Dec. 22, 2006, 7 pages.

* cited by examiner

PULSED POWER SYSTEM INCLUDING A PLASMA OPENING SWITCH

This application claims the benefit of U.S. Provisional Application Ser. 60/555,937 filed Mar. 24, 2004.

TECHNICAL FIELD

The invention relates generally to energy storage and compression. The invention relates more particularly to opening switches and pulsed power generation from stored inductive energy, and applications such as X-ray and nuclear energy production.

BACKGROUND ART

Pulsed power has a number of military, industrial, and scientific applications. For example, the U.S. Department of Defense has been using a variety of pulsed power devices such as the Z accelerator at Sandia National Laboratory for emulating nuclear weapon effects and verifying computer models. The Z machine is said to serve as a model for a larger X-1 machine, which should provide enough X-ray energy and power to implode fusion capsules of deuterium and tritium to achieve high-yield fusion.

For most applications, a high-voltage capacitor bank is discharged for pulsed power production. Unfortunately, the energy storage density of a typical high-voltage capacitor is relatively low, especially if the capacitor is rated for repetitive operation. Moreover, a fast current rise is important for obtaining not only a high pulsed power level but also a high X-ray or neutron yield. A fast current rise requires high voltage and low inductance. (See, e.g., U.S. Pat. No. 4,446,096 issued May 1, 1984.)

Due to the limitations of capacitor banks, there has been considerable effort toward developing pulsed power generators using stored inductive energy. There are a number of relatively low cost electrical power sources that provide stored inductive energy and have a relatively high energy density. These electrical power sources include homopolar generators, compensated alternators, and explosively-driven magnetic flux compressors. An opening switch, however, is needed for obtaining pulsed power having a fast current rise from the stored inductive energy.

For example, to power a dense plasma focus with an explosive generator, a useful switch would interrupt a few megamperes in less than one microsecond and remain open for the 3 to 4 microsecond pulse delivered to the device. (Freeman et al., "Plasma Focus Experiments Powered by Explosive Generators," LA-UR-83-1083, Los Alamos National Laboratories, Los Alamos, 1983, p. 13.)

Efforts toward development of a suitable opening switch are described in G. D. Roy, "High Power, High Repetition Rate Switches: An Overview," *Naval Research Review*, Vol. 2, 1990, p. 17-24. Desired attributes of the switch are fast opening, fast recovery to achieve high repetition rates, controllable and long conduction time, low resistance during conduction, fast rise of impedance during opening, high impedance after opening, large currents, large stand-off voltage, and jitter-free operation. The plasma flow switch is mentioned as having conduction time up to $10^{-5}$ seconds and opening time in the 100 nanosecond time scale, and as of 1990, useful only in very high power (terrawatt), low impedance (10 ohm), single shot, staged pulsed power systems. (Page 19.)

DISCLOSURE OF INVENTION

In accordance with a basic aspect, the invention provides a pulsed power system for supplying pulsed power to a load. The pulsed power system has an inductive energy storage circuit including a current source and a plasma opening switch. The plasma opening switch has a transmission line coupling the current source to the load for supplying current to the load. The transmission line extends away from a first region toward a second region near the load. The plasma opening switch has a closed state and an open state. The plasma opening switch changes from the closed state to the open state when a plasma discharge in the plasma opening switch is driven by magnetic force from the first region toward the second region. The pulsed power system includes electrical conductors arranged for providing a stabilizing magnetic field configuration in the first region to magnetically latch the plasma discharge in the first region during charging of the inductive energy storage circuit with current from the current source, and current flowing along the transmission line from the current source to the load tends to disrupt the stabilizing magnetic field configuration and unlatch the plasma discharge from the first region and drive the plasma discharge toward the second region.

In accordance with another aspect of the invention, the plasma discharge in the first region includes at least one array of plasma discharge elements. The plasma discharge elements in the array include a first plasma discharge element furthest from the second region and a last plasma discharge closest to the second region. The plasma discharge elements in the array are coupled to each other so that opening of the first plasma discharge element causes a sequential opening of the other plasma discharge elements in the array.

BRIEF DESCRIPTION OF THE DRAWINGS

Further objects and advantages of the invention will become apparent upon reading the following detailed description in view of the drawings, in which.

Figure 1:
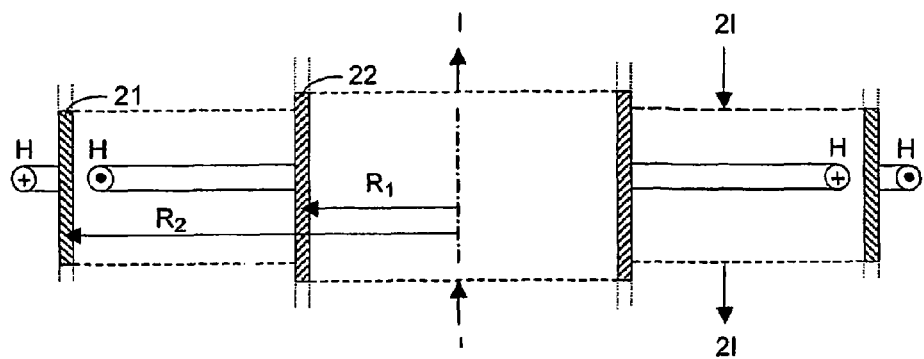
FIG. 1 is a diagram of a coaxial conductor configuration showing that a current in an inner conductor can stabilize an outer conductor shell carrying twice the current from electromagnetic force that would otherwise tend to cause an inward radial collapse of the outer conductor shell.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

MODE(S) FOR CARRYING OUT THE INVENTION

Pulsed-power systems often use a magnetically insulated transmission line to deliver power to a load. The load, for example, is a pinched plasma column, an imploding liner for a magnetized plasma target, a conical or hyperbolic array of fine wires for X-ray production, or a fusion fuel target or hohlraum for inertially confined fusion. When power is applied to the transmission line, any gas between the conductors of the transmission line is converted to plasma by the electric field in the transmission line. The resulting plasma is driven along the transmission line toward the load by electromagnetic Lorentz force (dF=I dl×B) at the Alfvén velocity ($V_A = B/(\mu_o \rho_m)^{1/2}$). The plasma causes the transmission line to function as a plasma opening switch. In particular, there is a delay in the application of power to the load. This delay is approximately the time that it takes for the plasma to be driven along the transmission line. This delay can have a beneficial effect if the delay is matched to the rise time of current from the circuitry that applies power to the transmission line.

Many pulsed power systems intentionally create plasma in a magnetically insulated transmission line in order to provide a plasma opening switch for increasing the rate at which current is applied to the load. Such a plasma opening switch is an integral component of a dense plasma focus device, in which the load is a z-pinched plasma column formed by the radial collapse of plasma including some plasma from the transmission line. Such a plasma-opening switch is also an integral part of a plasma flow switch.

The present invention is based on magnetic latching of a plasma flow switch in order to provide a stable closed state. This has the effect of increasing the delay provided by the plasma flow switch and reducing the on-resistance of the plasma flow switch during the closed state. It will be shown below that such magnetic latching is practical because only a fraction of the current applied to the transmission line is needed for holding off the flow of plasma toward the load, and this can be done in such a way that the plasma flow switch switches to a magnetically insulated state once there is a flow of plasma toward the load. In other words, the flow of plasma itself can cause a switching from the stable closed state to the open state. Moreover, the plasma discharge in the stable closed state can be established at an array of locations, and the switching of the plasma discharge from the closed state to the open state at one location will trigger the switching of the plasma discharges at neighboring locations from the closed state to the open state. Therefore, the switching process can occur very fast over a large area.

FIG. 1 shows a coaxial conductor configuration including an outer cylindrical conductor shell 21 and an inner cylindrical conductor shell 22. The outer conductor shell 21 has a radius of $R_2$ and the inner conductor shell 22 has a radius of $R_1$. The inner conductor shell 22 is shown carrying an electric current (I) in the upward direction and the outer conductor shell 22 is shown carrying twice the current (2I) in the opposite, downward direction. Assuming that the inner and outer conductors are co-extensive very far in the upward and downward directions and the current density has radial symmetry, then the magnetic field intensity (h) at a radius (r) will be a function of the total current (i) within the radius (r) according to $h = i/2\pi r$. Therefore, in the configuration of conductors and currents in FIG. 1, the magnetic field intensity will have about same magnitude $H = I/2\pi R_2$ at a location just outside and inside the outer conductor shell 21. The magnetic field will have a circumferential direction near the outer surface of the outer conductor shell 21 tending to force the outer conductor shell 21 inward, and the magnetic field will have an opposite circumferential direction near the inner surface of the outer conductor shell 21 tending to force the outer conductor shell outward. Therefore, there will be a net electromagnetic Lorentz force (dF=I dl×B) on the outer conductor shell 21 of about zero.

The configuration of conductors and electric current in FIG. 1 indicates that a central current can prevent the inward radial electromagnetic collapse of twice that current. As described further below, this principle can be used for magnetic latching of a plasma discharge of a plasma flow switch. The plasma discharge can be held in a closed state corresponding to the configuration of FIG. 1, in which the plasma discharge is analogous to the outer shell 21.

Figure 2:
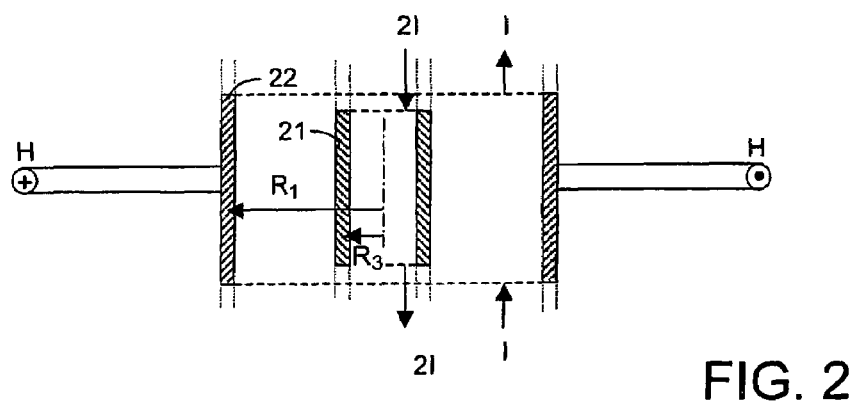
FIG. 2 shows the coaxial conductor configuration of FIG. 1 after an inward radial collapse of the outer conductor shell.

FIG. 2 shows the coaxial conductor configuration of FIG. 1 after an inward radial collapse of the outer conductor shell 21 to a radius of $R_3$. The magnetic field for any radius greater than $R_3$ has the same direction. This suggests that locations at a radius greater than $R_3$ can be magnetically insulated.

Figure 3:
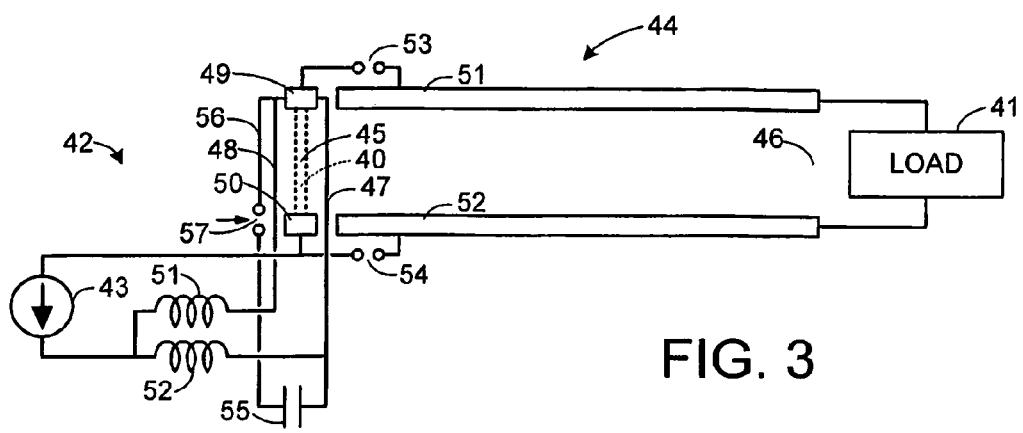
FIG. 3 shows a schematic diagram of a pulsed power system in accordance with one aspect of the present invention, during accumulation of inductive energy when a plasma opening switch of the pulsed power system is in a closed state.

FIG. 3 shows a schematic diagram of a pulsed power system for supplying pulsed power to a load 41. The pulsed power system includes an inductive energy storage circuit 42 including a current source 43 and a plasma opening switch 44. The plasma opening switch 44 has a transmission line including spaced conductors 51, 52 coupling the current source 43 to the load 41 for supplying current to the load. The transmission line extends away from a first region 45 toward a second region 46 near the load 41. The plasma opening switch has a closed state, as shown in FIG. 3. In the closed state, a plasma discharge 40 (represented by a pair of dashed lines) is located in the first region 45. The plasma opening switch changes from the closed state to an open state when the plasma discharge 40 is driven by magnetic force from the first region 45 to toward the second region 46. The movement of the plasma discharge from the first region 45 toward the second region 46 is show by the sequence of FIGS. 3, 4, 5, and 6.

Figure 5:
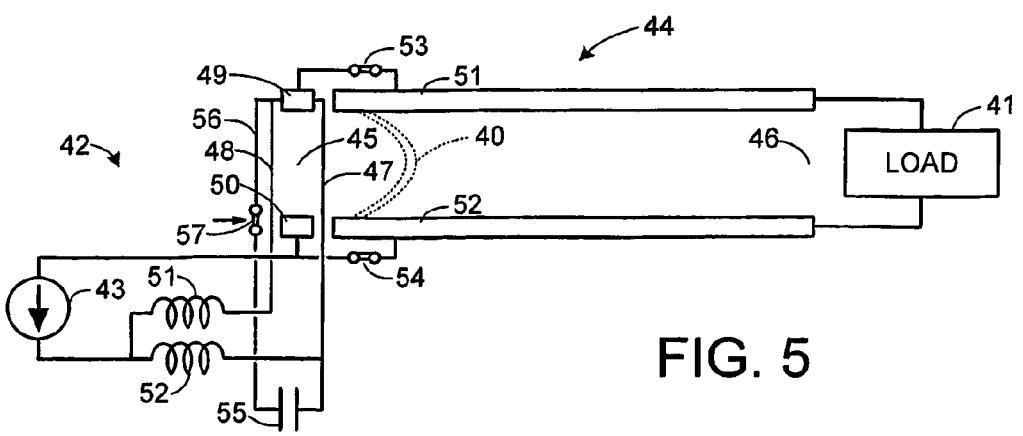
FIG. 5 shows the pulsed power system of FIG. 3 when the plasma opening switch has begun to open and drive plasma along a magnetically insulated transmission line toward a load.

As further shown in FIG. 3, the pulsed power system includes electrical conductors 47 and 48 arranged for providing a stabilizing magnetic field configuration in the first region 45 to magnetically latch the plasma discharge in the first region during charging of the inductive energy storage circuit 42 with current from the current source 43. (As further described below with reference to FIG. 7, the conductors 47 and 48 are bifurcated to provide a quadrupole configuration.) However, current flowing along the transmission line conductors 51, 52 from the current source 43 to the load 41 tends to disrupt the stabilizing magnetic field configuration and unlatch the plasma discharge 40 from the first region 45, as shown in FIG. 5, and drive the plasma discharge toward the second region 46. The first region 45 becomes magnetically insulated when the plasma opening switch is in the open state and conducting current from the current source to the load.

As further shown in FIG. 3, the electrical conductors 47 and 48 are in the inductive energy storage circuit 42 and carry current from the current source 43 to the plasma discharge 40 when the plasma discharge is in the first region 45 and the plasma opening switch is in the closed state. The electrical conductor 48 is in a first current path including an inductor 51 for carrying a first current component tending to magnetically force the plasma discharge 40 toward the second region 46 when the plasma discharge is in the first region 45. The electrical conductor 47 is in a second current path including an inductor 52 for carrying a second current component tending to magnetically force the plasma discharge 40 away from the second region 46 when the plasma discharge is in the first region 45.

As further shown in FIG. 3, the pulsed power system includes a trigger pulse generator including a capacitor 55, a conductor 56, and a closing switch 57 coupled to the first and second current paths for applying a trigger pulse to discharge the capacitor into the inductive energy circuit 42. This increases the difference between the first current component and the second current component to destabilize the stabilizing magnetic field configuration and thereby switch the plasma opening switch from the closed state to the open state. In particular, triggering of the closing switch 57 causes the closing switch 57 to close, and closing of the closing switch 57 diverts current from the inductor 52 away from the conductor 47 and into the conductor 56. This decrease in current through the conductor 47 and increase in current through the conductor 56 forces the plasma discharge 40 toward the load 41.

Figure 4:
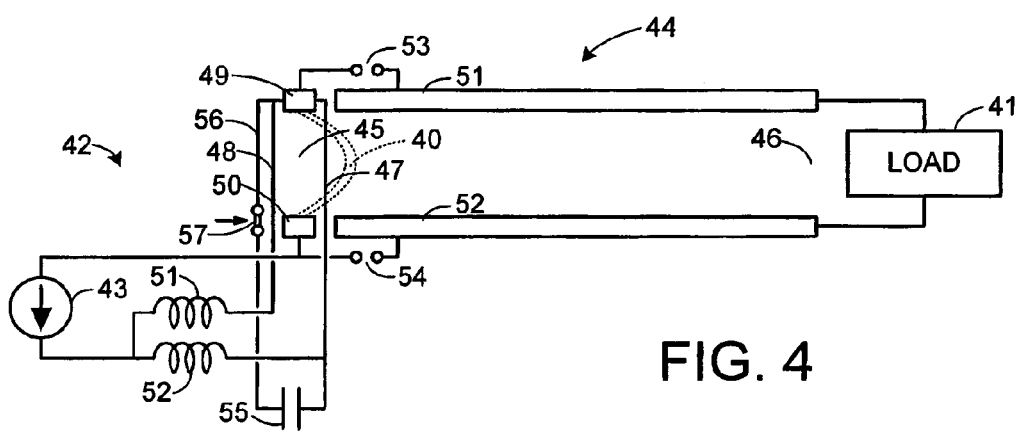
FIG. 4 shows the pulsed power system of FIG. 3 after a trigger pulse has been applied to cause the plasma opening switch to change from the closed state to an open state.

As shown in FIG. 4, the closing of the closing switch 57 has caused the plasma discharge to move toward the load 41. The direct path between the electrodes 49 and 50 becomes magnetically insulated, producing a substantial voltage across the electrodes 49 and 50.

As shown in FIG. 5, the substantial voltage across the electrodes 49 and 50 has caused isolation devices 53 and 54 to conduct current. The isolation device 53 connects the electrode 49 to the transmission line conductor 51, and the isolation device 54 connects the electrode 50 to the transmission line conductor 52. The isolation devices 49 and 50, for example, are spark gaps, metal oxide varistors, or silicon carbide varistors, which have a high incremental resistance for a low applied voltage, and a low incremental resistance for a high applied voltage. The threshold voltage for conduction of the spark gaps or varistors, for example, is slightly greater than the voltage required for sustaining the plasma discharge across the spaced electrodes 49, 50 in the first region when the plasma switch is in the closed state. The isolation devices 53 and 54 could also be semiconductor diodes, thyristors, or other kinds of switching devices. In general, the isolation devices have a relatively high resistance when the plasma discharge is in the first region 45 and the plasma opening switch 44 is in a closed state, and the isolation devices have a relatively low resistance when the plasma opening switch is in an open state.

Figure 6:
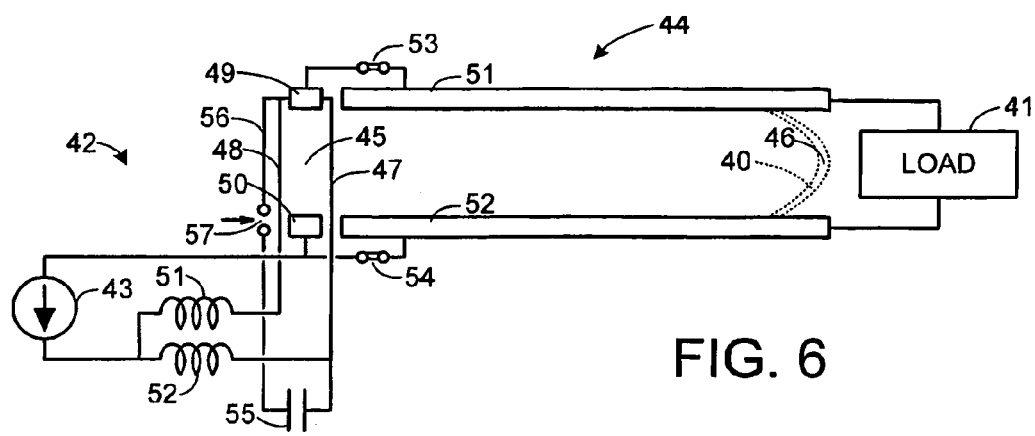
FIG. 6 shows the pulsed power system of FIG. 3 when the plasma has been driven along the transmission line and has reached a region near the load.

Once the isolation devices become conductive, the plasma discharge 40 conducts current between the transmission line conductors 51 and 52, and magnetic force drives the plasma discharge 40 toward the load 41. As shown in FIG. 6, the plasma discharge 40 eventually reaches the region 46 near the load, and further displacement of the plasma discharge causes the current flowing through the transmission line 44 to be applied to the load 41.

Figure 7:
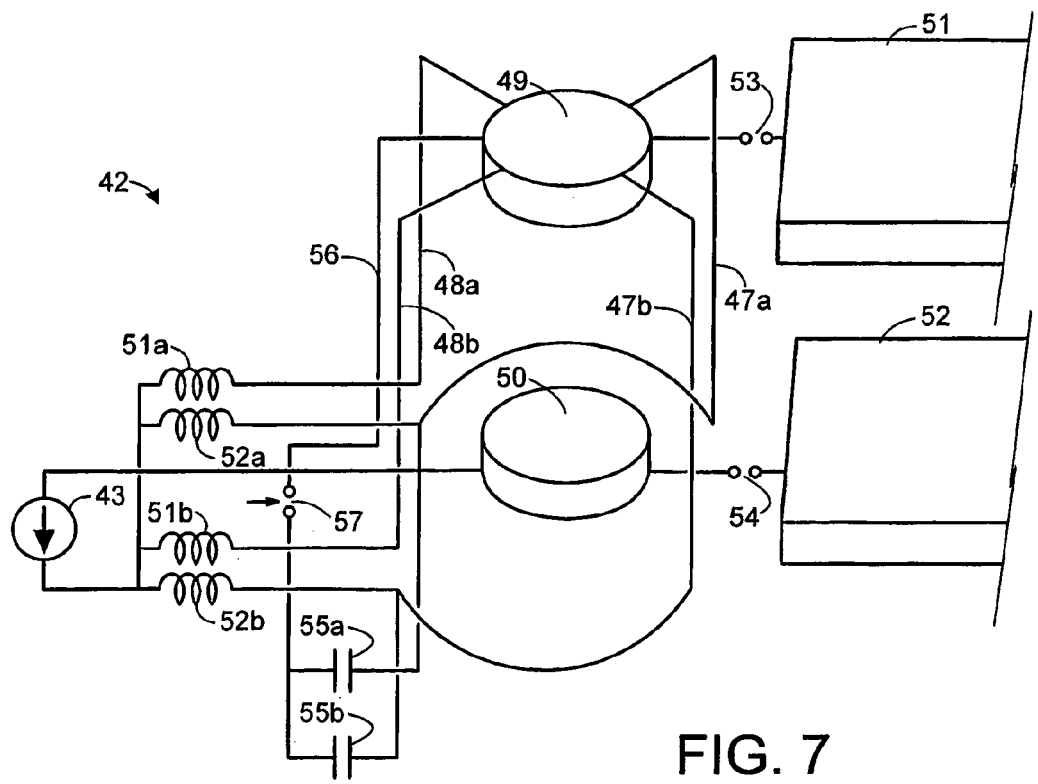
FIG. 7 shows a more detailed schematic diagram of the pulsed power system of FIG. 3.

FIG. 7 further shows three-dimensional aspects of the pulsed power system introduced in the two-dimensional schematic diagram of FIG. 2. FIG. 7 shows that the conductors 47, 48, and inductors 51 and 52 and capacitor 55 are bifurcated (into components designated with similar reference numerals having a suffix "a" or "b") to provide a quadrupole magnetic field configuration for gross MHD stabilization of the plasma discharge 40 when the plasma opening switch is in its closed state. The conductors 47a and 47b are parallel-spaced and disposed between the second region (46 in FIG. 6) and the first region (45 in FIG. 6, between the electrodes 49 and 50 in FIG. 7) so that the plasma discharge passes between the conductors 47a and 47b when the plasma opening switch changes from the closed state to the open state.

Omitted from FIG. 7 is a dielectric structure that electrically insulates the conductors 56, 47a, 47b, 48a, and 48b from the plasma discharge and provides physical support for these conductors and the electrodes 49, 50 and the transmission line conductors 51 and 52. Such a dielectric structure is shown in FIGS. 8 to 12. This dielectric structure is a sandwich of three glass or ceramic dielectric layers that are fused together. Moreover, as will be further described below, a large-scale pulsed power system may include a circular array of circuits each as shown in FIG. 3, disposed around a common load. In this case, each of the three glass or ceramic dielectric layers is annular shaped.

Figure 8:
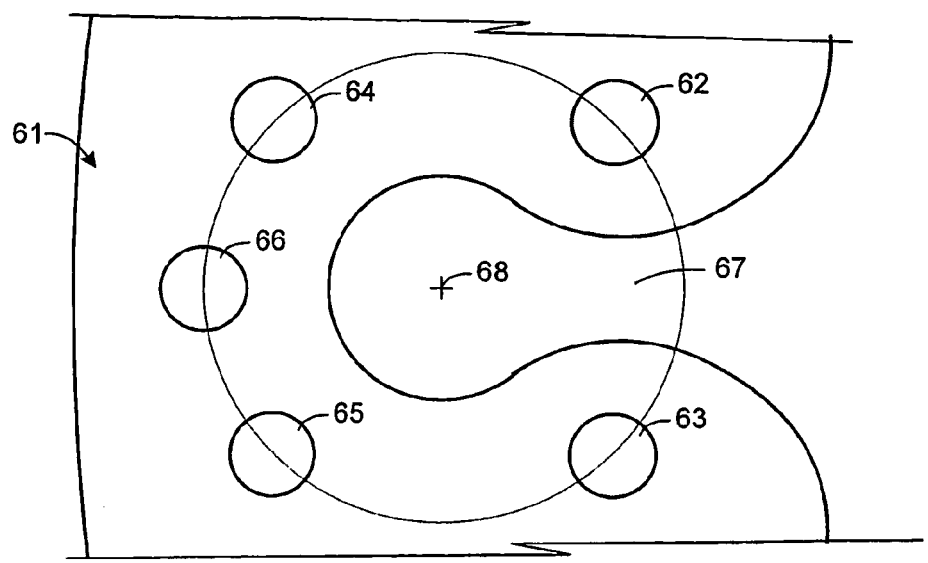
FIG. 8 shows a top view of an insulator plate or ring for the pulsed power system of FIG. 3.

FIG. 8 shows a top view of the middle dielectric layer 61. The middle dielectric layer has a series of holes 62, 63, 64, 65, and 66 arranged in a circular pattern around a center 68 which is the central axis of a plasma discharge when the plasma flow switch is in is stable closed state. The hole 62 and 63 permit the conductors 47a and 47b of FIG. 7 to pass through the middle dielectric layer 61. The holes 64 and 65 permit the conductors 48a and 48b to pass through the middle dielectric layer 61. The hole 66 permits the conductor 56 to pass through the middle dielectric layer 61. The middle dielectric layer 61 defines a channel 67 through which the plasma discharge moves from the center 68 toward the load.

Figure 9:
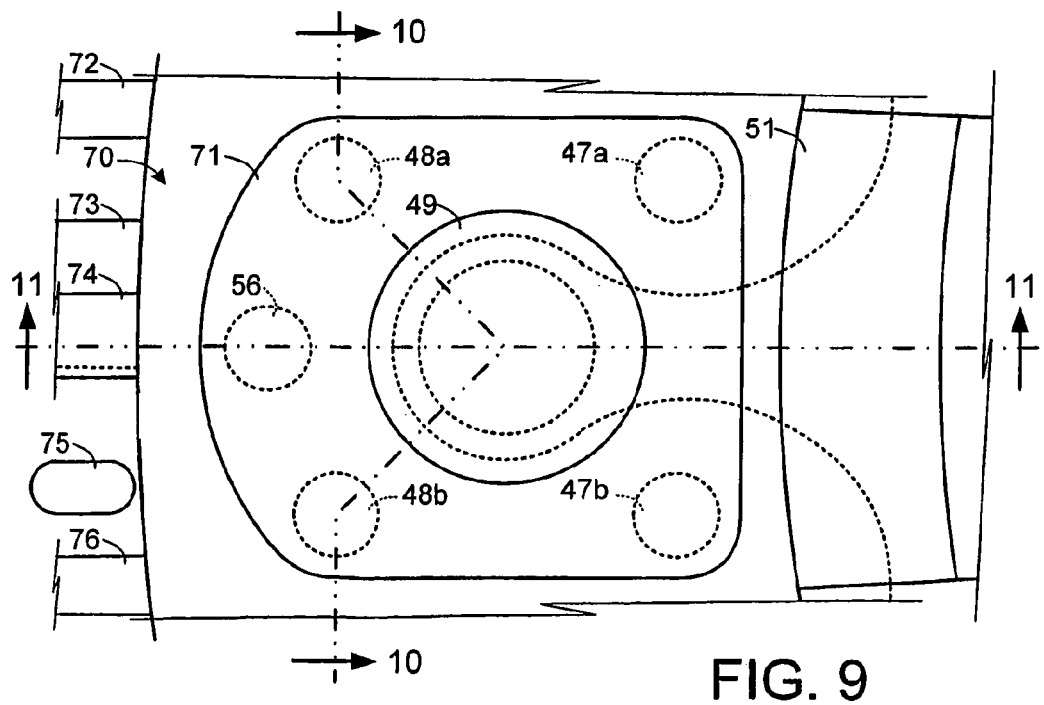
FIG. 9 shows a top view of a pair of spaced electrodes in the pulsed power system of FIG. 3.

FIG. 9 shows a top view of the plasma opening switch once components have been assembled onto the middle dielectric layer. These components include an upper dielectric layer 70, a metal plate 71 interconnecting the conductors 47a, 47b, 48a, 48b, and 56 to the upper electrode 49, and the upper transmission line conductor 51. Also seen in FIG. 9 are a number of bus bars for connections underneath the dielectric layers. These bus bars include a bus bar 72 connected to the conductor 48a, a bus bar 73 connected to the lower electrode (50 in FIG. 7), a bus bar 74 connected to the conductor 56, a bus bar 75 connected to the capacitors (55a and 55b in FIG. 7), and a bus bar 76 connected to the conductor 48b.

Figure 10:
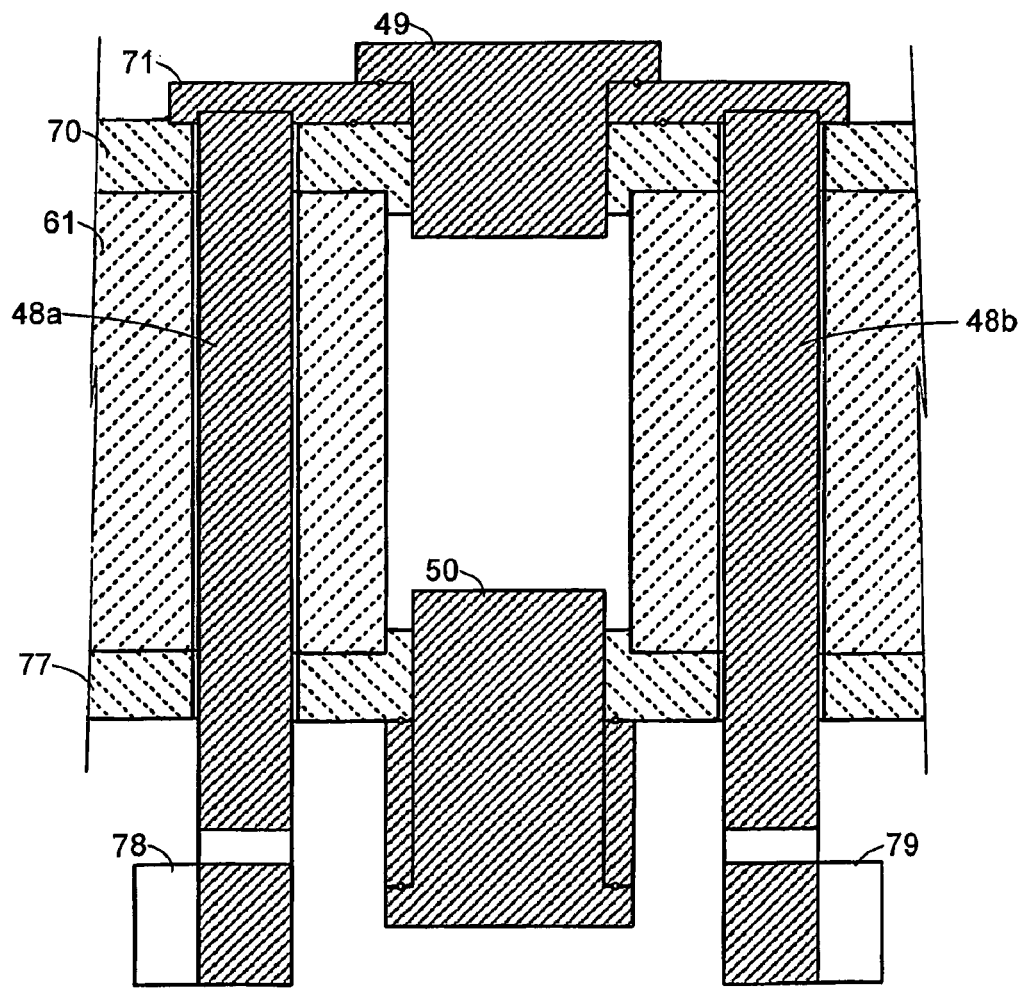
FIG. 10 shows a cross-section of the pair of spaced electrodes in the pulsed power system of FIG. 3 along line 10-10 in FIG. 9.

FIG. 10 shows a cross-section of the plasma opening switch in the vicinity of the electrodes 49 and 50. The three dielectric layers 70, 61, and 77 are shown sandwiched together. Also seen in FIG. 10 are lower bus bars 78 and 79, which are connected to the conductors 47a and 47b.

Figure 11:
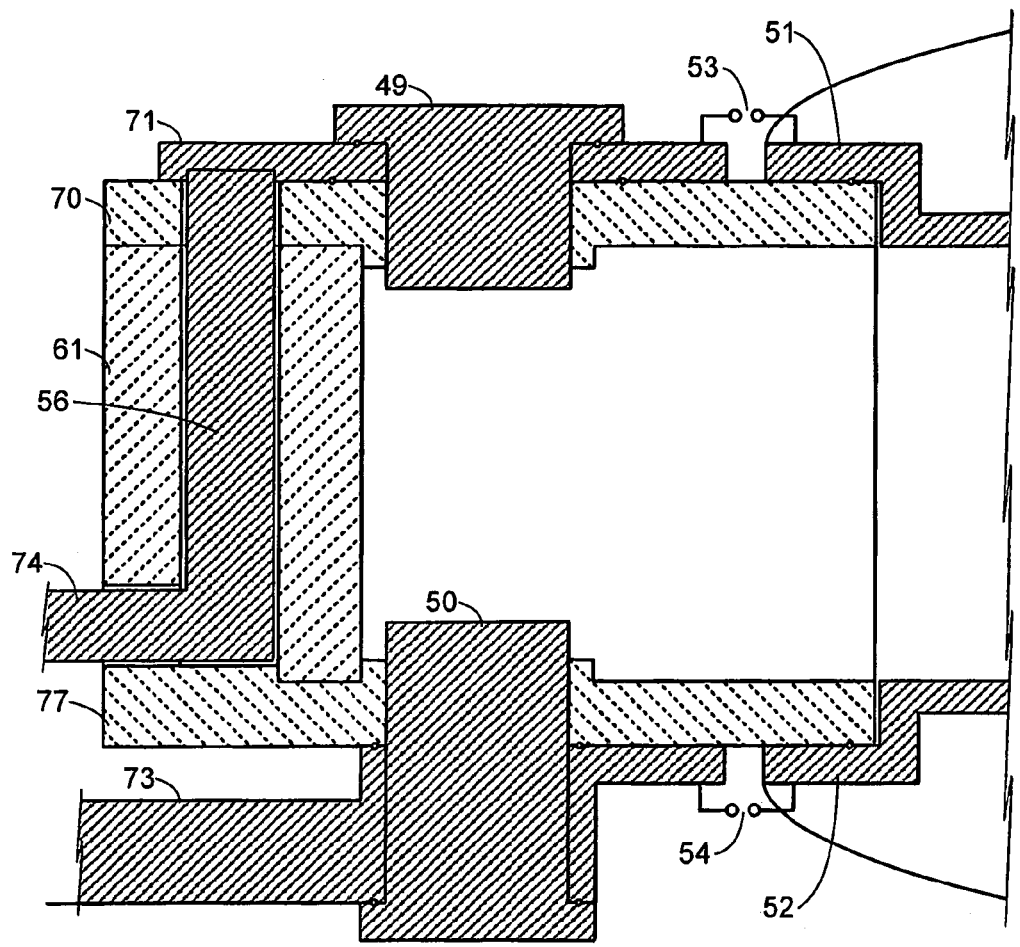
FIG. 11 shows a cross-section of the pair of spaced electrodes in the pulsed power system of FIG. 3 along line 11-11 in FIG. 9.

FIG. 11 shows another cross-section of the plasma opening switch in the vicinity of the electrodes 49 and 50. FIG. 11 shows the connection of the bus bar 74 to the conductor 56 and the connection of the bus bar 73 to the lower electrode 50. It is also seen that the dielectric layers 70, 61 and 77 are sandwiched between the transmission line conductors 51 and 52.

Figure 12:
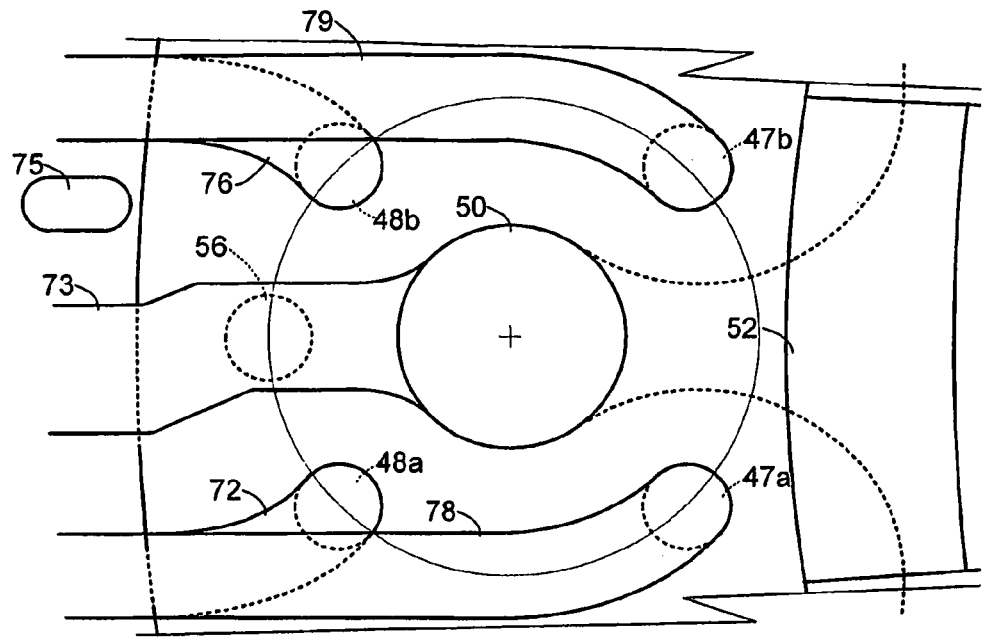
FIG. 12 shows a bottom view of the pair of spaced electrodes in the pulsed power system of FIG. 3.

FIG. 12 shows a bottom view of the plasma opening switch in the vicinity of the lower electrode 50. This shows the connections of the bus bars 72, 73, 76, 78, and 79 to the conductor 48a, electrode 50, conductor 48b, conductor 47a, and conductor 47b, respectively.

The maximum voltage that can be tolerated across the electrodes in the pulsed power system 44 of FIG. 3 is limited by dielectric breakdown between the lower electrode 50 and the conductors 47 and 48. The pulsed power system 44 is essentially a "single ended" design in which the lower electrode 50 can be grounded. This has the advantage of simplicity in construction and ease of insulating the bus bars 72, 73, 86, 78, and 79 of FIG. 12 in a pool of dielectric liquid such as mineral oil.

Figure 13:
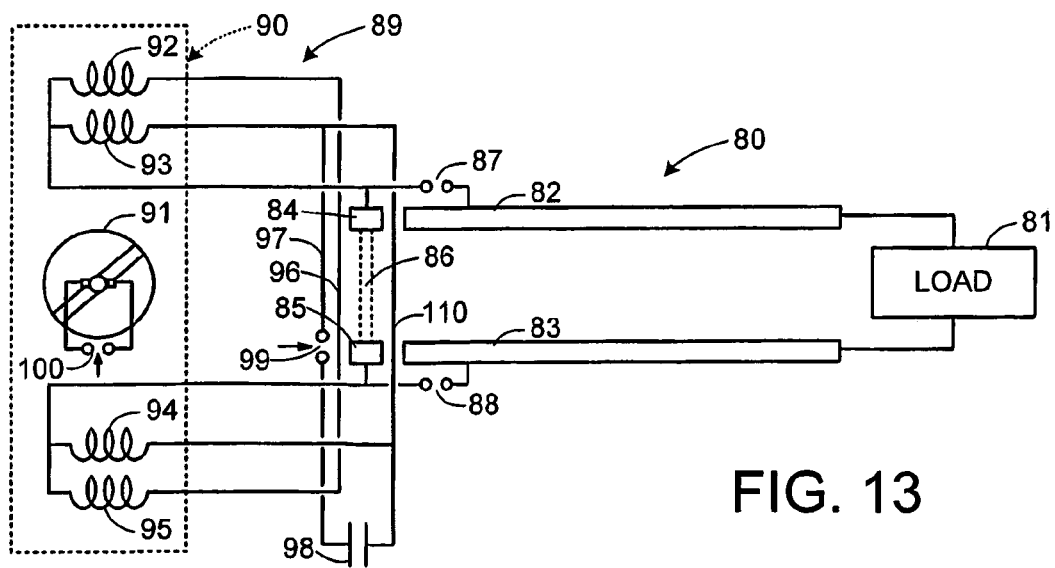
FIG. 13 shows a schematic diagram of an alternative bipolar design for a pulsed power system in accordance with the invention.

FIG. 13 shows a pulsed power system 80 having a bipolar design permitting the maximum voltage across the electrodes 84 and 85 to be doubled in comparison to the single ended design of FIG. 3. The pulsed power system 80 in FIG. 13 has a load 81 connected to transmission line conductors 82 and 83. The electrodes 84 and 85 provide an initial plasma discharge 86 and are coupled to the transmission line conductors 82 and 83, respectively, via isolation devices 87 and 87, respectively.

A compensated alternator 91 functions as a bipolar current source to provide current to the electrodes 84 and 85, and the current path includes conductors 110 and 96 providing a stabilizing quadrupole magnetic field configuration for the initial plasma discharge 86. The compensated alternator 90 includes a rotor 91 and stator coils 92, 93, 94 and 95, and a switch 100 is closed so that a current pulse is generated in the stator coils. Further details regarding the construction of a suitable compensated alternator are found in Weldon et al. U.S. Pat. No. 4,841,217 issued Jun. 20, 1989, incorporated herein by reference, and Pratap et al. U.S. Pat. No. 5,210,452, issued May 11, 1993, incorporated herein by reference.

For switching the plasma opening switch of the electrodes 84 and 85 from a closed to an open state, a closing switch 99 discharges a capacitor 98 so as to divert current from the conductor 110 to a conductor 97.

Figure 14:
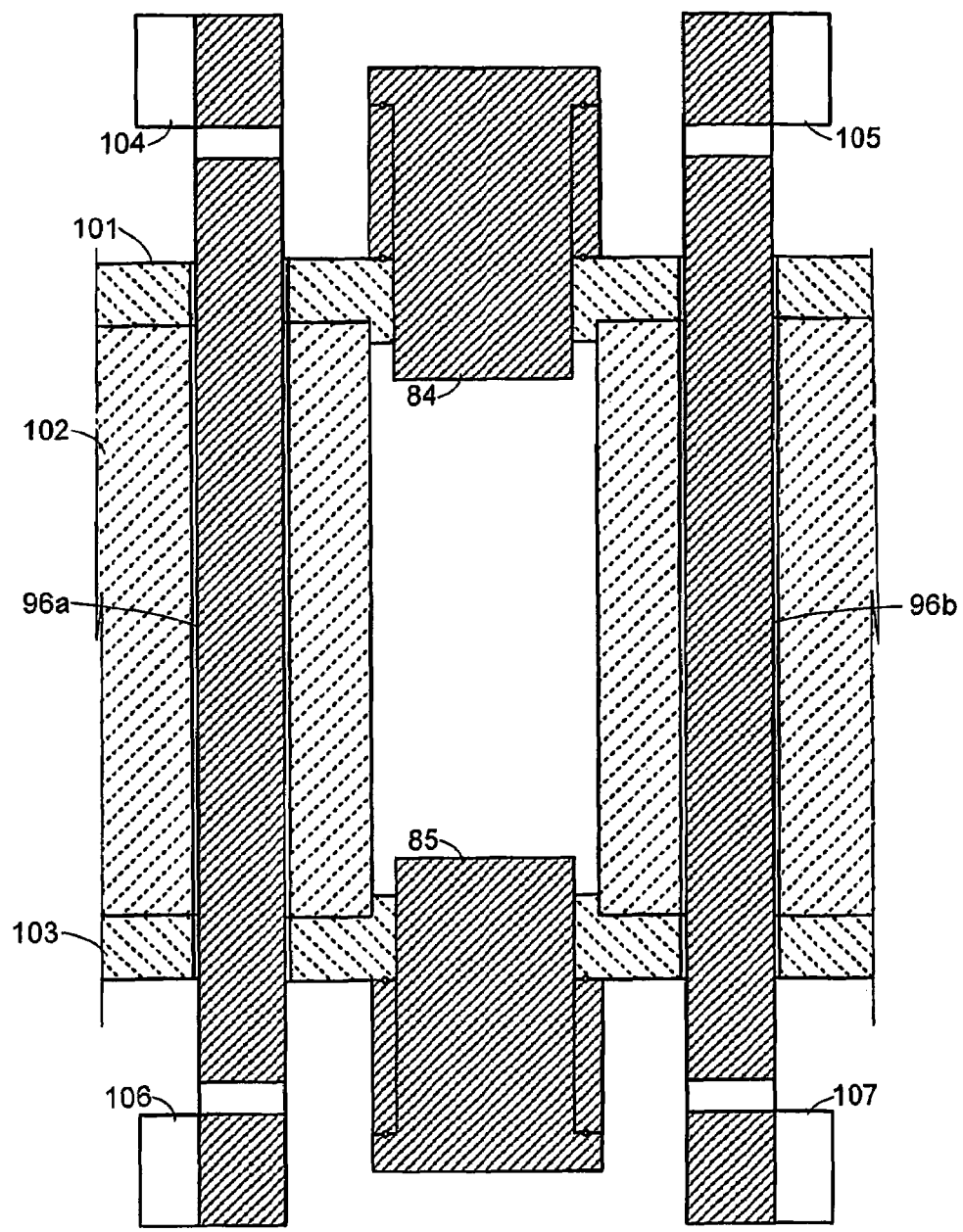
FIG. 14 shows a cross section of the alternative bipolar design for the pulsed power system of FIG. 13 from a vantage point similar to FIG. 10.

FIG. 14 shows a cross-section of the pulsed power system of FIG. 13 in the vicinity of the electrodes 84 and 85. In comparison to the cross-section of FIG. 10 for the single-ended design of FIG. 3, the cross-section in FIG. 14 for the bipolar design of FIG. 13 has a set of upper bus bars 104, 105 that are similar to a set of lower bus bars 106, 107.

For some applications, it is desirable to configure the inductive storage circuit (42 of FIG. 3) to promote self-triggering of the opening switch of the pulsed power system. This can be done by configuring the inductive storage circuit so that that when the plasma opening switch is in the closed state and the inductive energy storage circuit becomes charged by the current source, the difference between the first current component ($I_1$) to the conductor 48 and the second current component ($I_2$) to the conductor 47 is an increasing function of time so that the stabilizing magnetic field configuration becomes destabilized for switching of the plasma opening switch from the closed state to the open state. For example, as shown in FIG. 15, the first current component ($I_1$) can be an increasing function of time 111 when the second current component ($I_2$) is an increasing and then a decreasing function of time.

Figure 15:
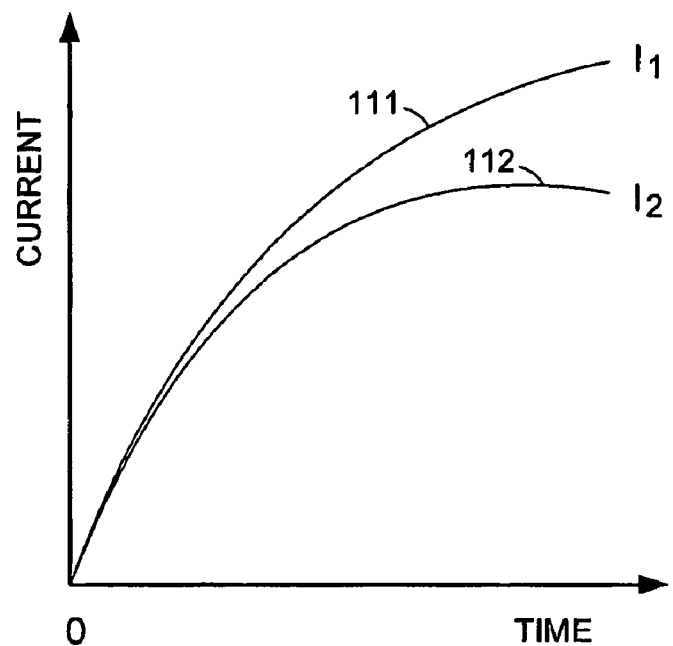
FIG. 15 shows graphs of current as a function of time for self-triggering of the plasma opening switch in the pulsed power system of FIG. 3.
Figure 16:
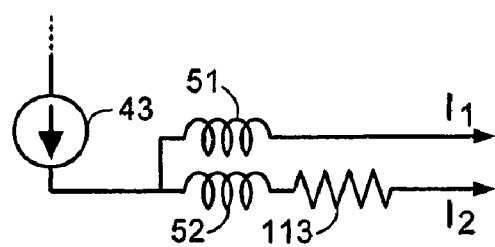
FIG. 16 shows a schematic diagram of a circuit for producing the current functions of FIG. 15 by inserting a resistance in one of the circuit paths.

FIG. 16 shows one way of configuring the inductive storage circuit to obtain the current functions of FIG. 15. In FIG. 16, a resistance 113 is inserted in the second circuit path providing the second current component ($I_2$), so that the second circuit path has a hither resistance than the first circuit path providing the first current component ($I_1$). Therefore, the magnitude of the second current component ($I_2$) will reach a peak and fall off before the first component ($I_1$) reaches a peak.

Figure 17:
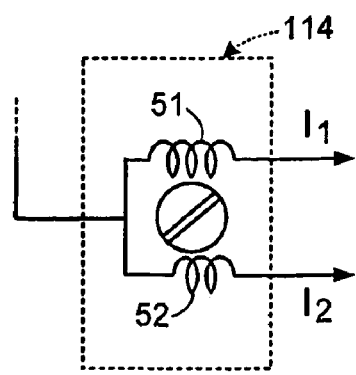
FIG. 17 shows a schematic diagram of a circuit for producing the current functions of FIG. 15 by different size and phase placement of stator windings on a compensated alternator.

FIG. 17 shows another way of configuring the inductive storage circuit to obtain the current functions of FIG. 15. In FIG. 16, the inductances 51 and 52 in the respective circuit paths providing the first and second current components ($I_1$ and $I_2$) are provided by respective stator windings of a compensated alternator 114, and these stator windings have a spatial extent and relative phase placement to provide the desired current functions of FIG. 15.

Figure 18:
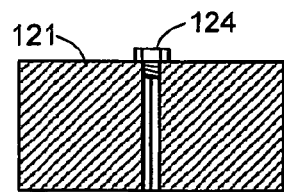
FIG. 18 shows an exploding wire configuration for initiating a plasma discharge.
Figure 19:
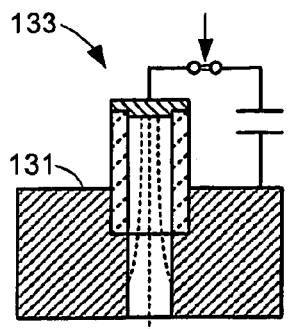
FIG. 19 shows a pseudo-spark generator configuration for initiating a plasma discharge.
Figure 20:
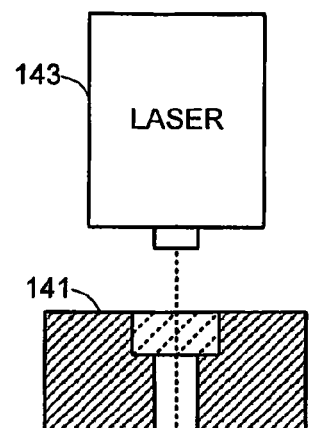
FIG. 20 shows a laser configuration for initiating a plasma discharge.

FIGS. 18 to 20 show various means for initiating a plasma discharge between a pair of electrodes, such as the electrodes 49 and 50 in FIG. 3 or 84 and 85 in FIG. 13. In some cases, dielectric breakdown voltage across the electrodes will be relatively low in comparison to the voltage produced by the current source 43 in FIG. 3 so that no additional means will be needed for initiating the plasma discharge. In such cases, the discharge will occur shortly after the current source 43 is activated, for example when a compensated alternator is switched on, or an explosive magnetic flux compression generator or is detonated.

As shown in FIG. 18, for single-shot applications, a thin metal wire 123 can be strung from a plug 124 in the upper electrode 121 to an insert 125 in the lower electrode 122 to initiate a plasma discharge between the electrodes when the current source is activated. In this case, the wire 123 will explode and provide a metal vapor arc between the electrodes 121, 122.

As shown in FIG. 19, for multi-shot applications, a pseudo-spark generator 133 can provide a beam 134 of photons, ions, or electrons having sufficient energy to initiate a plasma discharge between the electrodes 131 and 132.

As shown in FIG. 20, for repetitive operation, a laser 143 can provide a beam of photons 144 for initiating a plasma discharge between the electrodes 141. For example, the electrode 141 is an anode and the electrode 142 is a cathode. For operation when there is a very low pressure of gas between the electrodes 141 and 142, the laser 143 is a carbon dioxide laser that heats the cathode to initiate thermionic emission. For operation when there is a relatively high pressure of gas between the electrodes 141 and 142, the laser is an excimer laser providing a beam of ultraviolet radiation that ionizes the gas between the electrodes 142 and 143. To reduce undesirable effects of electro-erosion, the cathode 142 can have a pool of liquid metal 145 such as lithium for supporting a plasma arc discharge.

Figure 21:
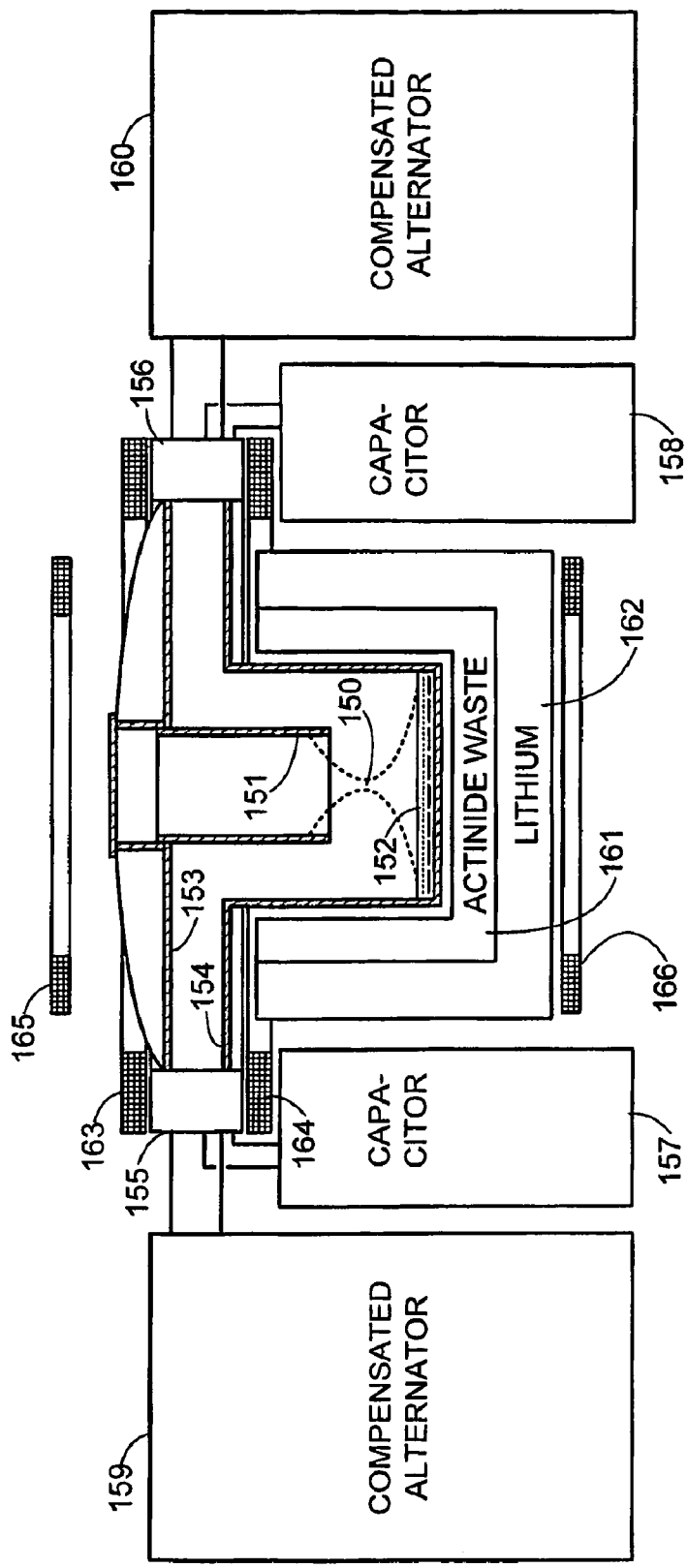
FIG. 21 is a schematic diagram, in lateral cross-section, of a plasma focus or spheromac fusion-fission reactor including a circular array of pulsed power systems as shown in FIG. 3 or FIG. 13 supplying pulsed power to a common load at a central location in the reactor.

The pulsed power system 44 of FIG. 3 can be used in a nuclear fusion reactor such as the fusion-fission reactor shown in FIG. 21. In this case, the transmission line conductors of the opening switch include electrodes of a plasma flow switch, namely, a dense plasma focus device. The reactor produces a dense plasma focus 150 at a central location between a central anode 151 and a cathode including a pool of molten lithium 152. Respective transmission line plates 153, 154 couple opening switches 155, 156 to the central anode 151 and cathode 152. The opening switches 155, 156 are triggered in synchronism by discharging respective capacitors 157, 158. Compensated alternators 159, 160 provide current to the opening switches. An inner blanket of actinide waste 161 (such as depleted uranium) and an outer blanket of lithium 162 provide radiation shielding and breed tritium for fueling of the plasma focus with a mixture of deuterium and tritium gas.

By magnetizing the transmission line plates 153, 154, the fusion-fission reactor operates as a spheromac device instead of a dense plasma focus device. The transmission line plates are magnetized by energizing electromagnet coils 163 and 164, so that helicity is injected into the plasma discharge driven from the opening switches 155, 156 inward toward the central region of the reactor. A pair of Helmholtz coils 165, 166 above and below the central region of the reactor can null out the magnetic field at the central region of the reactor by opposing the magnetic field from the electromagnet coils 163 and 164.

Figure 22:
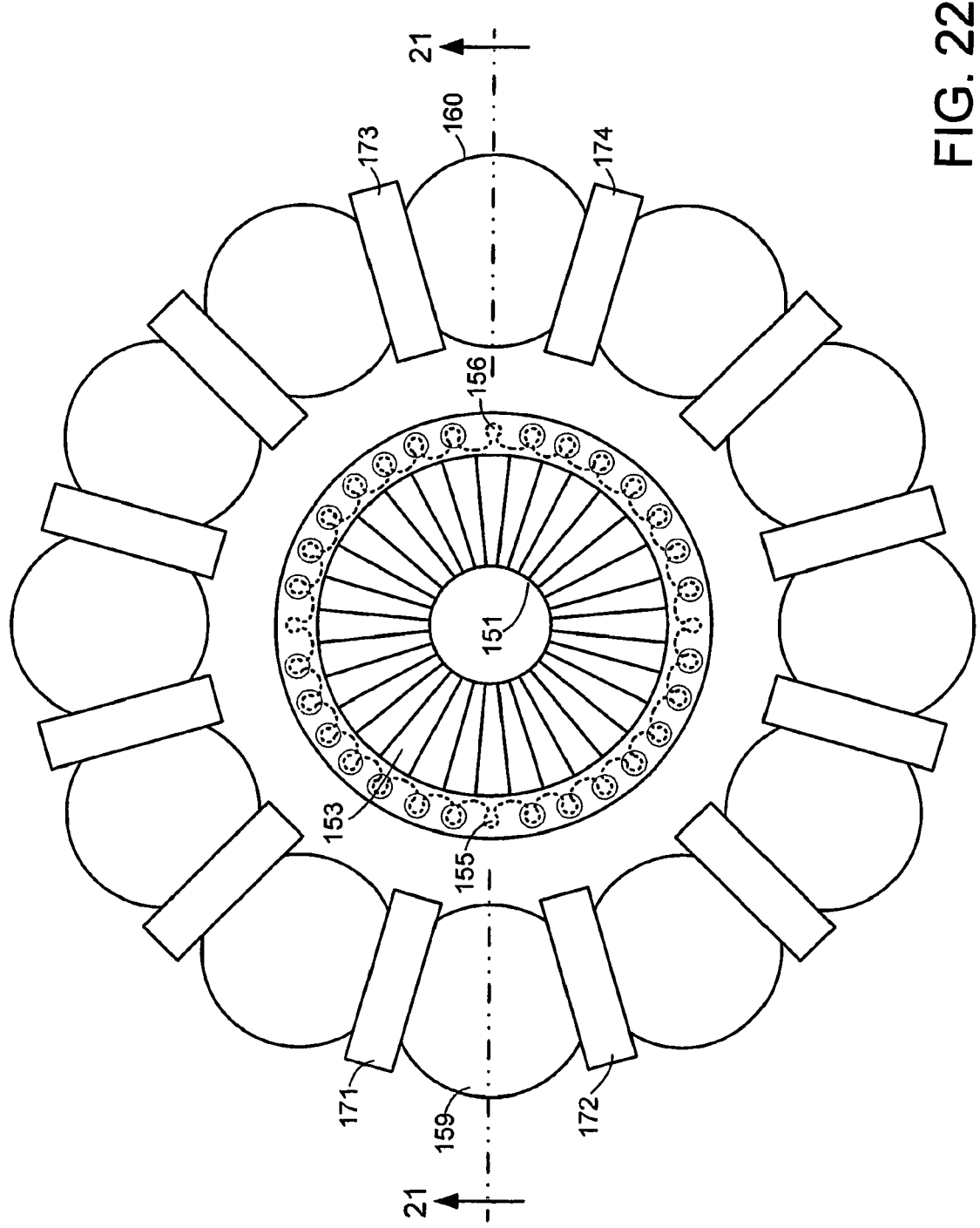
FIG. 22 is a top view of the fusion-fission reactor of FIG. 21.

As shown in FIG. 22, the opening switches 155, 156 are just two switches in a circular array of opening switches, and the compensated alternators 159, 160 are just two compensated alternators in a circular array of compensated alternators. Respective excitation field coils 171, 172 and 173, 174 for the compensated alternators 159, 160 are shared with neighboring compensated alternators in the array, so that the excitation field for the compensated alternators is confined to a toroidal region of the compensated alternators.

Figure 23:
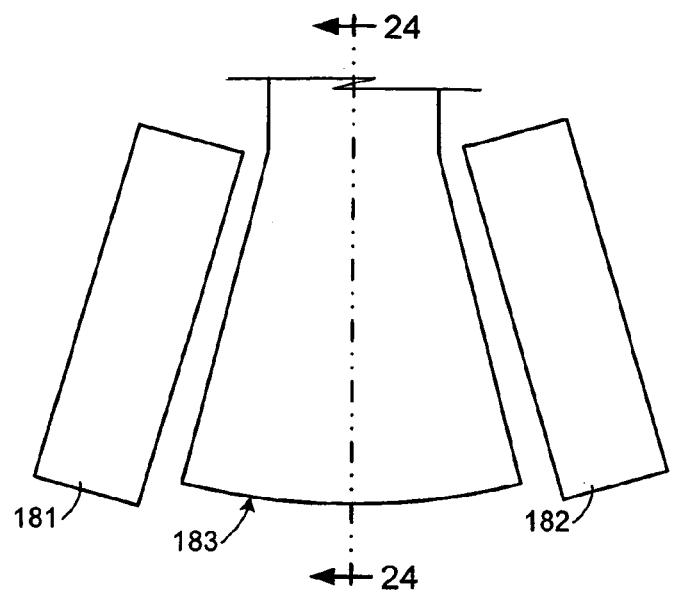
FIG. 23 is a top view of one explosively-driven magnetic flux compressor between two excitation field coils.

For single-shot applications, explosive magnetic flux compression generators can be used in lieu of the compensated alternators of FIG. 22. The excitation field coils can be kept in place for exciting the magnetic flux compression generators. FIG. 23, for example, shows an explosive magnetic flux compression generator 183 between two field coils 181 and 182.

Figure 24:
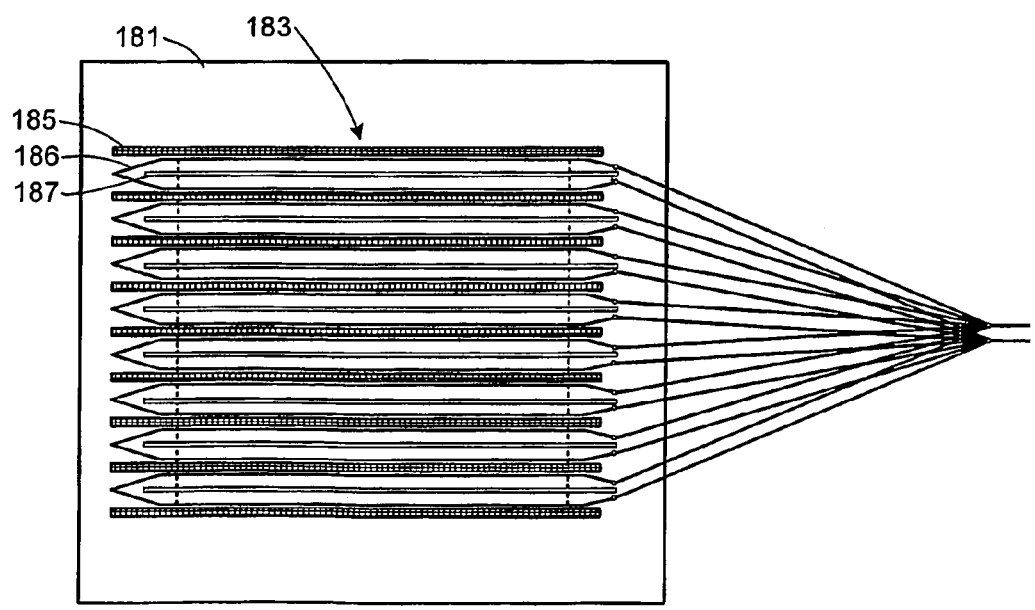
FIG. 24 is a lateral cross-section of the explosively-driven magnetic flux compressor along line 24-24 in FIG. 23.

FIG. 24 shows a cross-section of the explosive magnetic flux compression generator 183. The explosive magnetic flux compression generator 183 includes alternate layer sheets of explosive 185, metal conductor 186, and insulator 187 such as polyethylene or polyvinyl chloride. Detonation of the explosive layers causes loops of the metal conductor layers to implode upon the insulator layers and compress the magnetic flux from the field coils trapped within the metal conductor loops. The loops of metal conductor are connected in parallel for increased current, and in series if needed to provide sufficient voltage for overcoming the voltage drop of the plasma discharge across the opening switch.

As described above, the opening switch 44 in FIG. 3 is capable of switching from a closed state in which the plasma discharge 40 is held within a stabilizing magnetic field configuration to an open state in which the region 45 between the electrodes 49 and 50 becomes magnetically insulated. Such operation of the opening switch 40 is demonstrated by computer simulation using a finite element analysis program as listed below.

Figure 25:
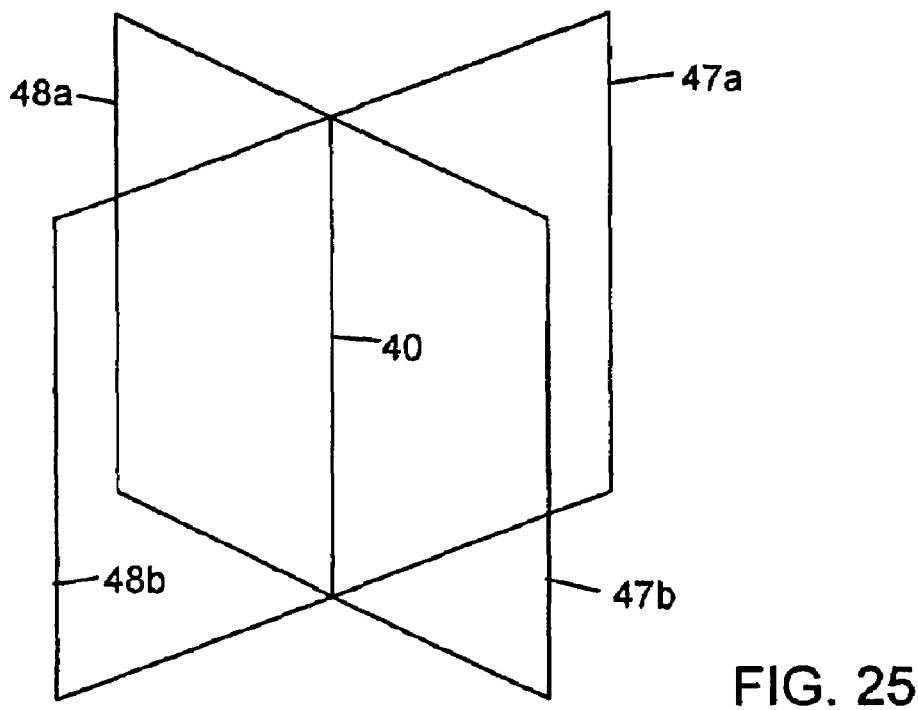
FIG. 25 is an oblique view of a finite element model of electrical conductors that establish the stabilizing magnetic field configuration in a respective one of the opening switches.
Figure 26:
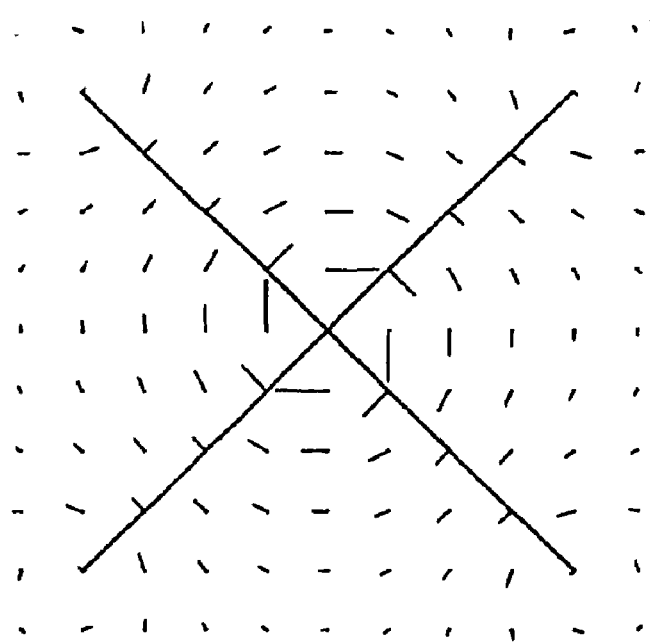
FIG. 26 is a top view of the finite conductor elements of FIG. 23 and the magnetic field, at a horizontal bisecting plane, produced by current flowing in the finite conductor elements.

FIG. 25 is an oblique view of a finite element model of the electrical conductors 47a, 47b, 48a, 48b that establish the stabilizing magnetic field configuration in the opening switch as was shown and described in FIGS. 7 to 12. It is assumed that the current flowing downward through the plasma discharge 40 is supplied by an upward one-quarter of the current through each of the conductors 47a, 47b, 48a, 48b. FIG. 26 shows the resulting magnetic field, at a horizontal bisecting plane, produced by this current distribution through the finite element model of FIG. 25.

Figure 27:
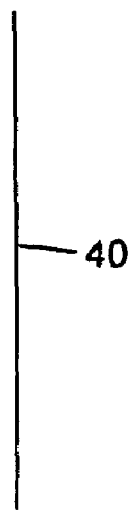
FIG. 27 is an oblique view of the central finite conductor element of FIG. 25.
Figure 28:
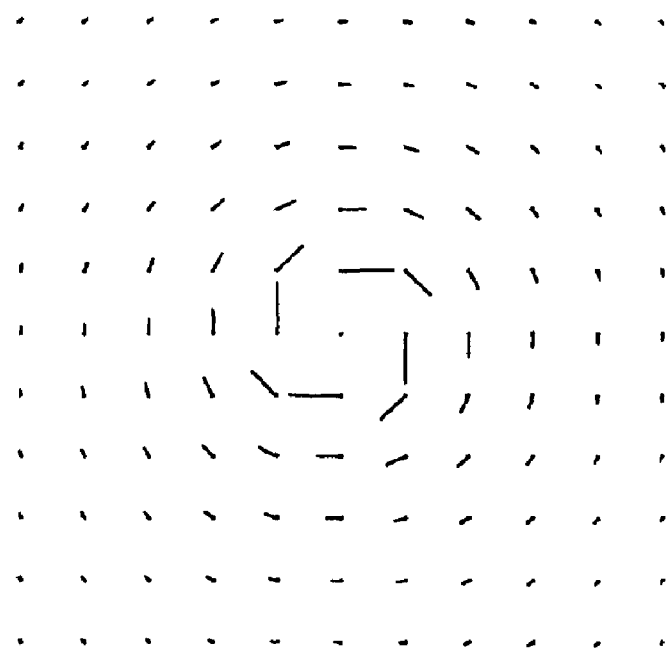
FIG. 28 is a top view of the central finite conductor element and its magnetic field contribution, at the horizontal bisecting plane.

As introduced in FIGS. 3 to 6, the magnetic force upon the plasma discharge determines a sequence of operation of the plasma opening switch. To better show the spatial distribution of this force upon current flowing in the plasma discharge, the magnetic field of FIG. 26 can be split into a contribution to the magnetic field due to the solid conductors (such as the current elements 47a, 47b, 48a, 48b) and a contribution to the magnetic field due to the current flowing through the plasma discharge itself. For example, the current flowing through the plasma discharge 40, as shown in FIG. 27, produces the magnetic field contribution shown in FIG. 28, in accordance with the Biot-Savart law. However, this magnetic field contribution caused by the current flowing through the plasma discharge 40 does not result in any net force upon the plasma discharge as a whole.

Figure 29:
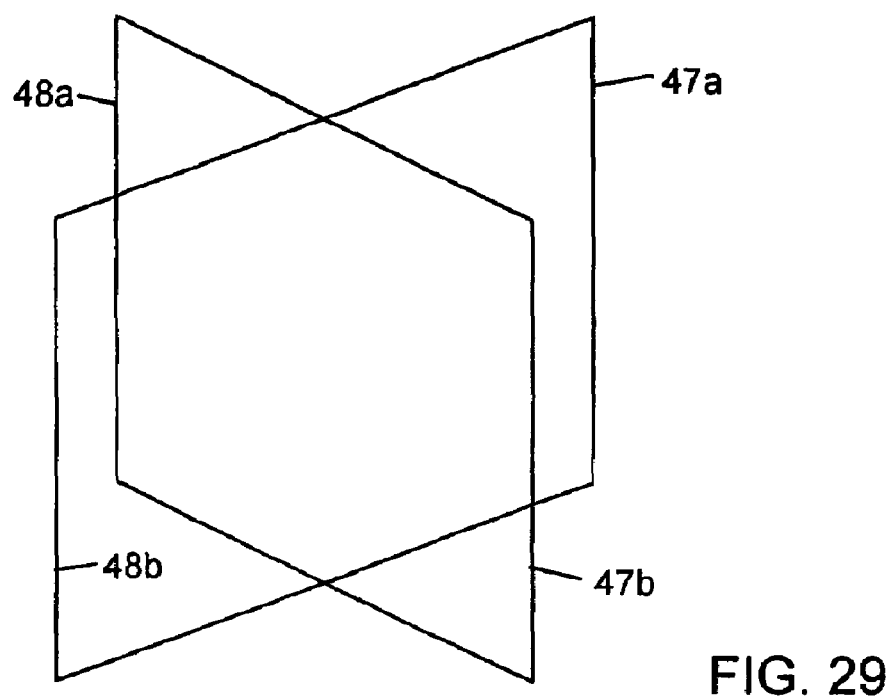
FIG. 29 is an oblique view of the finite element model of FIG. 25 after removal of the central finite conductor element.
Figure 30:
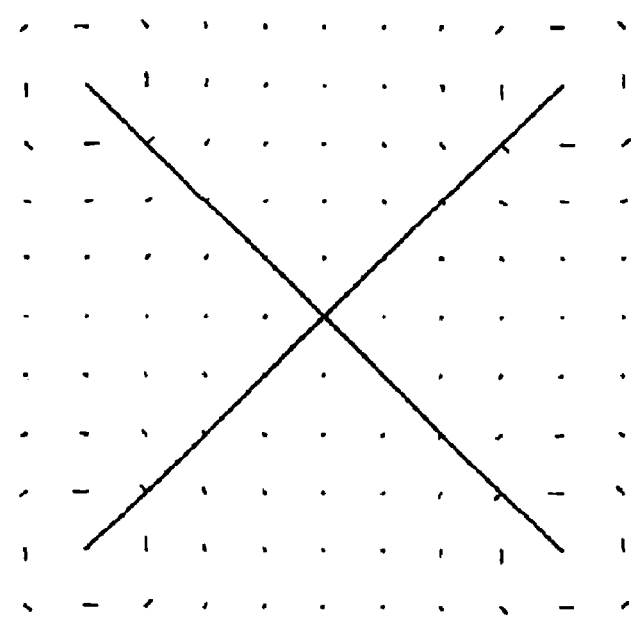
FIG. 30 is a top view of the finite element model of FIG. 29 and its magnetic field contribution, at the horizontal bisecting plane.

FIG. 29 shows the finite element model of the solid conductors in the opening switch. The current through these solid conductors produces the magnetic field contribution shown in FIG. 30. This is a magnetic quadrupole field configuration providing a local minimum of magnetic force upon the plasma discharge at a central location between the conductors 47a, 47b, 48a, and 48b. This magnetic field configuration tends to produce a net force upon the plasma discharge 40 tending to confine the plasma discharge to the central location between the conductors 47a, 47b, 48a, and 48b.

Figure 31:
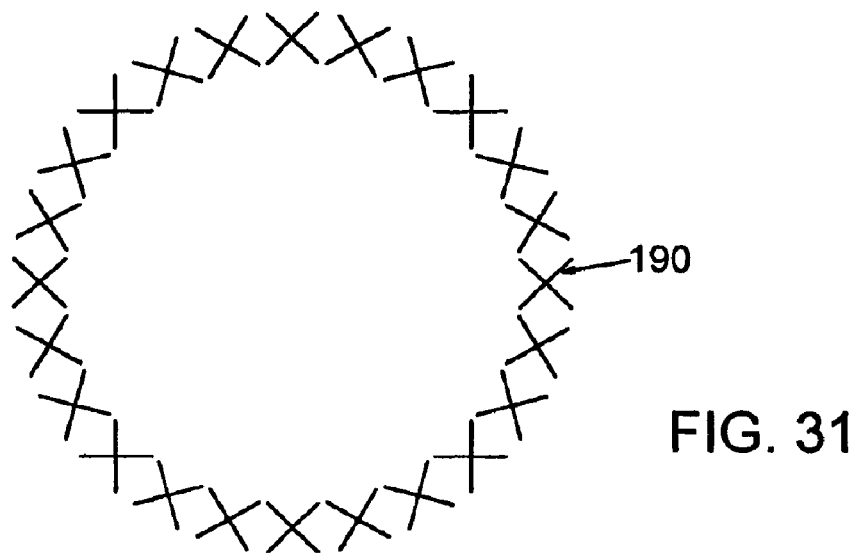
FIG. 31 is a top view of conductors in a finite element model of a circular array of opening switches.
Figure 32:
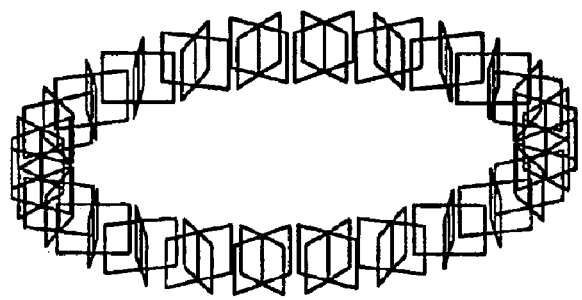
FIG. 32 is an oblique view of the conductors in the finite element model of the circular array of opening switches of FIG. 31.

As described above with respect to FIG. 8 and FIGS. 21 and 22, it is desired to use a circular array of the opening switches in order to supply pulsed power to a common load at a central location with respect to the circular array. In this case, the magnetic field in the neighborhood of each switch is affected by the current flowing through all of the current elements in all of the switches of the array. For example, FIG. 31 is a top view of conductors in a finite element model of a circular array of opening switches; FIG. 32 is an oblique view of the conductors in the finite element model of the circular array of opening switches of FIG. 31; and FIG. 33 shows the magnetic field in the neighborhood of a single opening switch 190 in the circular array.

Figure 33:
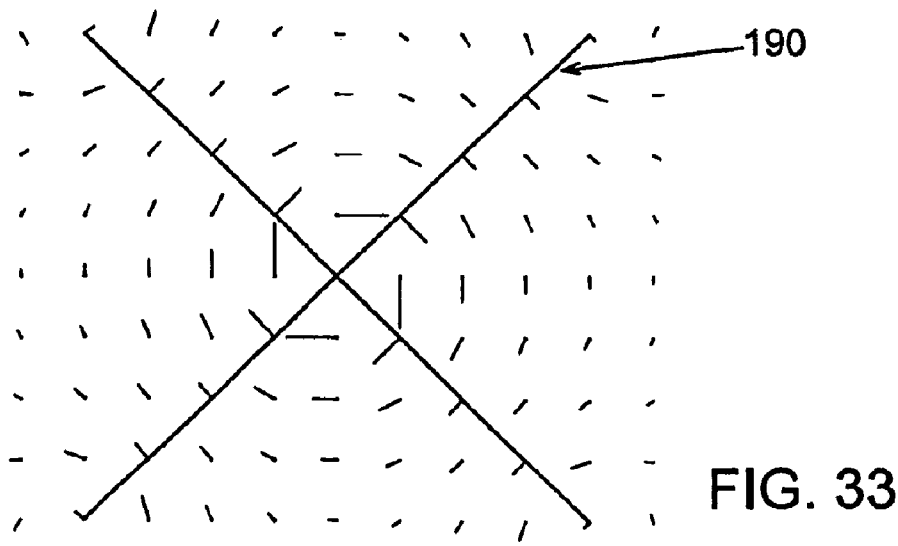
FIG. 33 is a top view of the finite element model of a single one of the opening switches in the array of FIG. 31, and the magnetic field at the horizontal bisecting plane.
Figure 34:
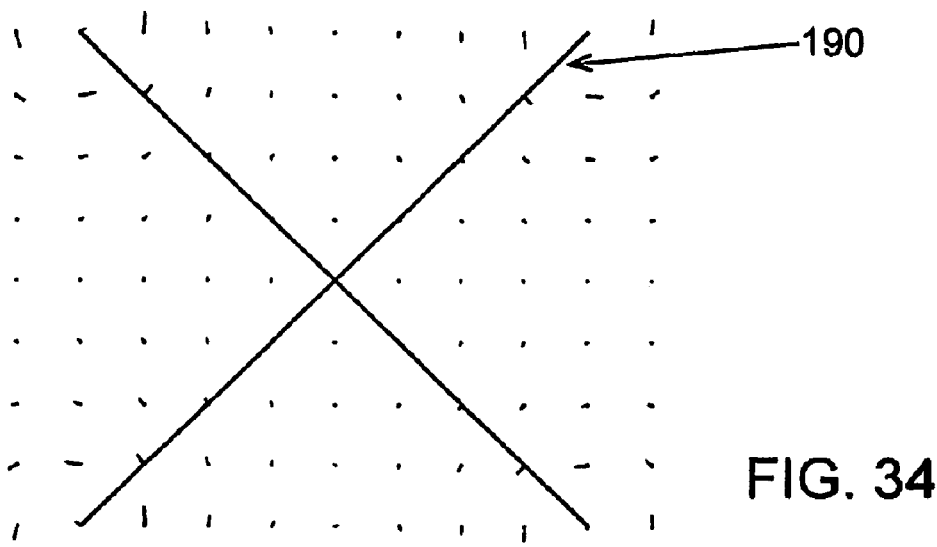
FIG. 34 is a top view similar to FIG. 33 but showing the magnetic field contribution when the central finite conductor element (representing the plasma discharge in the single one of the opening switches) is removed.
Figure 35:
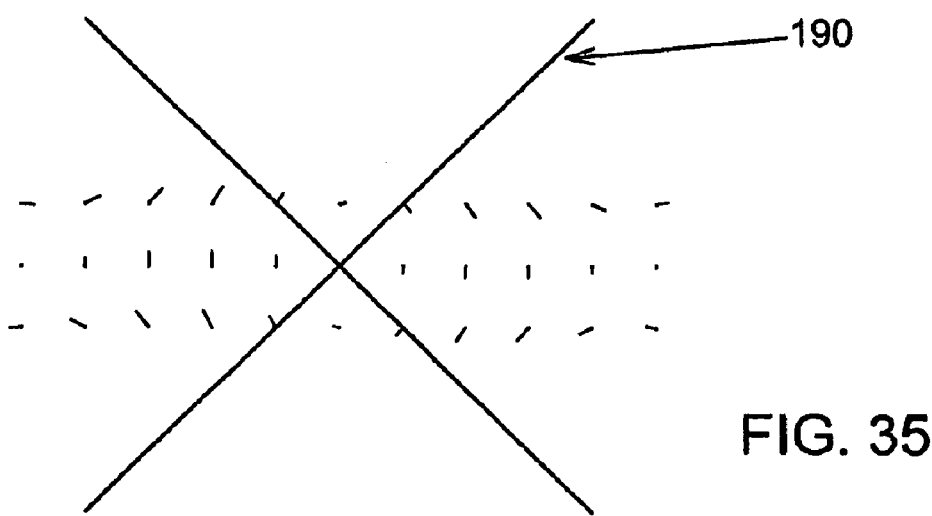
FIG. 35 is a top view similar to FIG. 34 but for a scaling up of the magnetic field contribution by a factor of 5 to better show the confining quadrupole field configuration in the central region of the plasma discharge.

FIG. 34 is a top view similar to FIG. 33 but showing the magnetic field contribution when the central finite conductor element (representing the plasma discharge in the single one of the opening switches) is removed. This magnetic field configuration in FIG. 34 is a quadrupole configuration similar to FIG. 30. The field configuration of FIG. 34 is shown in FIG. 35 after scaling up by a factor of five. It should be apparent from FIG. 35 that the plasma discharge in the switch 190 will be confined to the central location with respect to the conductors 47a, 47b, 48a, 48b.

Figure 36:
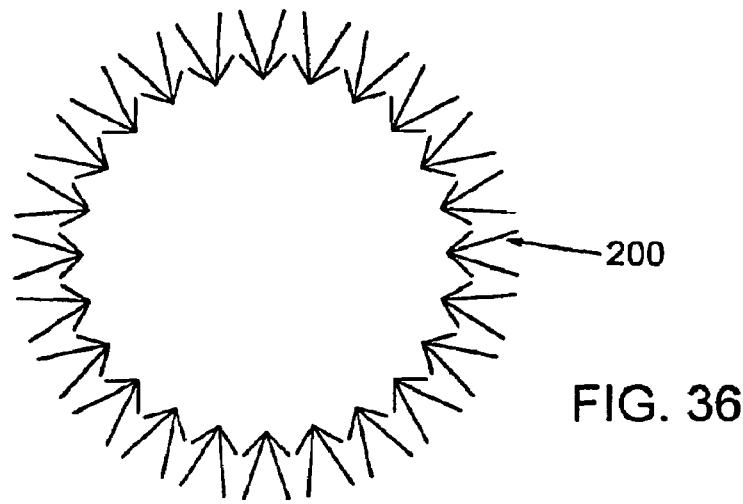
FIG. 36 is a top view of a finite element model similar to FIG. 31 but for a state similar to FIG. 5 in which the plasma discharge in each opening switch has been displaced toward the load at a central location with respect to the circular array.
Figure 37:
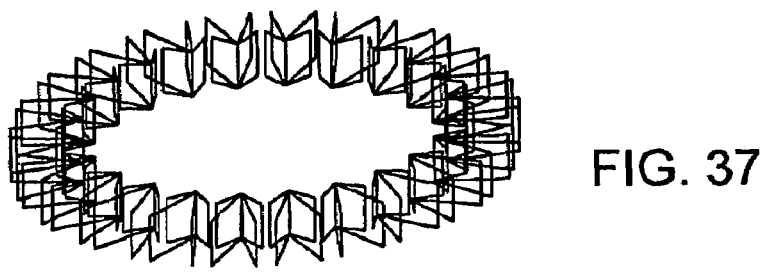
FIG. 37 is an oblique view of the conductors in the finite element model of the circular array of opening switches of FIG. 36.
Figure 38:
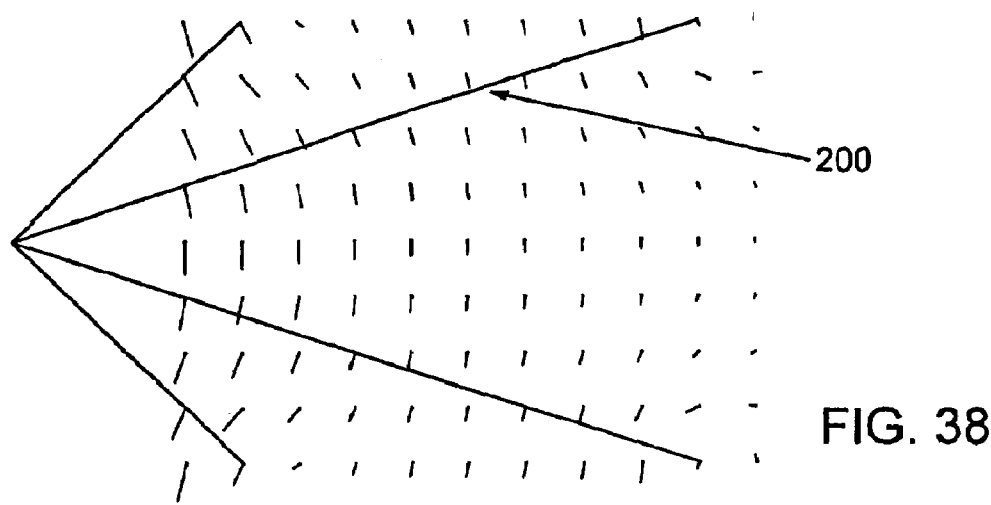
FIG. 38 is a top view of one of the opening switches in the circular array of FIG. 36 and the magnetic field in the horizontal bisecting plane, which shows that this one of the opening switches has become magnetically insulated.

FIG. 36 is a top view of a finite element model similar to FIG. 31 but for a state similar to FIG. 5 in which the plasma discharge in each opening switch has been displaced toward the load at a central location with respect to the circular array. FIG. 37 shows an oblique view of the finite element model of FIG. 36. FIG. 38 shows the magnetic field configuration in the neighborhood of one switch 200. This magnetic field configuration in FIG. 38 shows that the opening switch 200 has become magnetically insulated.

Figure 39:
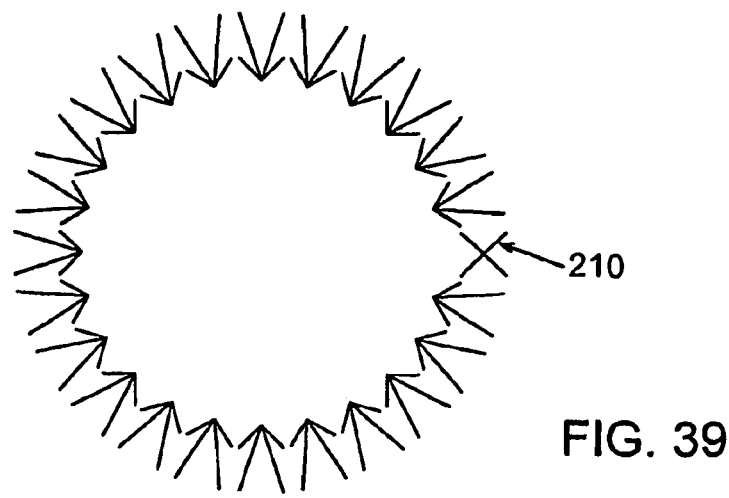
FIG. 39 is a top view of a finite element model similar to FIG. 31 but for a hypothetical case where the single one of the opening switches fails to be triggered and is presumed (incorrectly) not to open.
Figure 40:
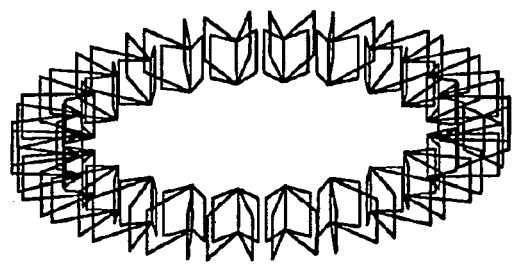
FIG. 40 is an oblique view of the finite element model of FIG. 39.
Figure 41:
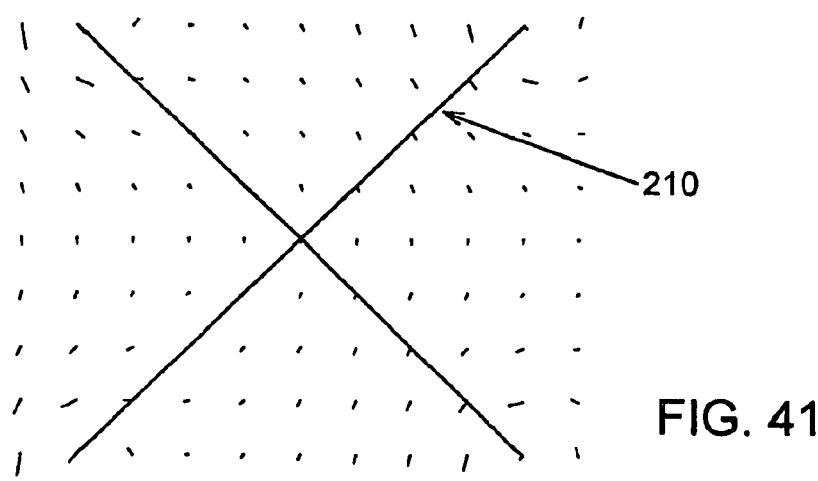
FIG. 41 is a top view showing the magnetic field in the horizontal bisecting plane for the single one of the opening switches.

FIG. 39 is a top view of a finite element model similar to FIG. 31 but for a hypothetical case where a single opening switch 210 fails to be triggered and is presumed (incorrectly) not to open. FIG. 40 shows an oblique view of the finite element model of FIG. 39. FIG. 41 shows the magnetic field in the neighborhood of the single opening switch 210. The magnetic field configuration in FIG. 41 demonstrates that the opening of the other switches in the array will cause the opening switch 210 to become magnetically insulated and cause the plasma discharge of the opening switch 210 to be driven toward the load at the central location with respect to the array.

Figure 42:
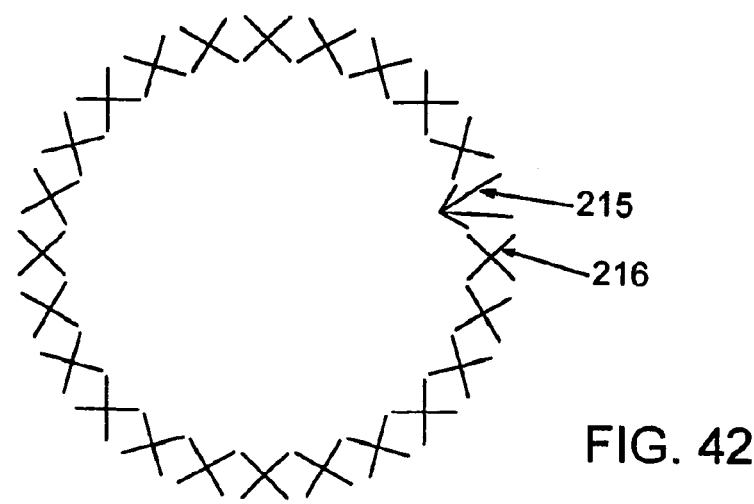
FIG. 42 is a top view of a finite element model for a case where a single one of the opening switches in the circular array is in an open state.
Figure 43:
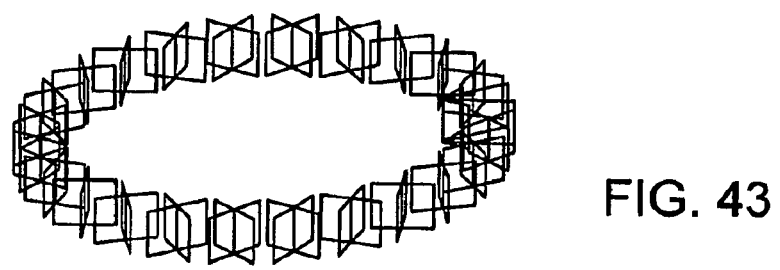
FIG. 43 is an oblique view of the finite element model of FIG. 42.
Figure 44:
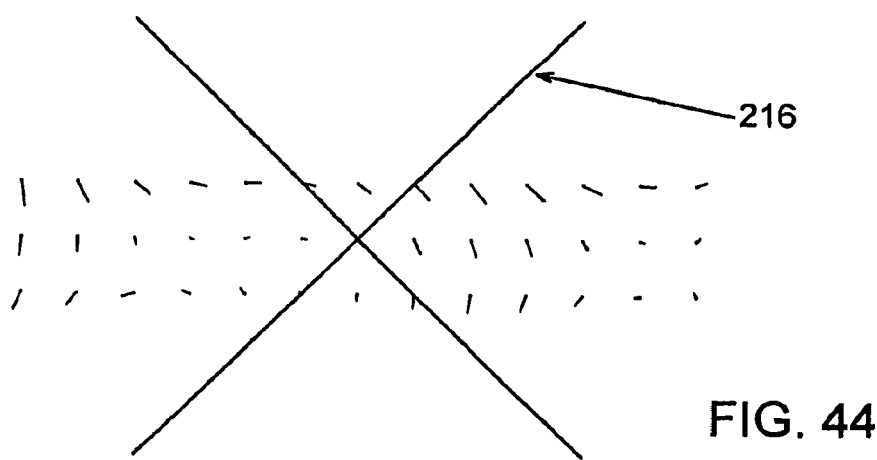
FIG. 44 is a top view showing the magnetic field (scaled up by a factor of 5) in the horizontal bisecting plane at an opening switch neighboring the single one of the opening switches that is in the open state.
Figure 45:
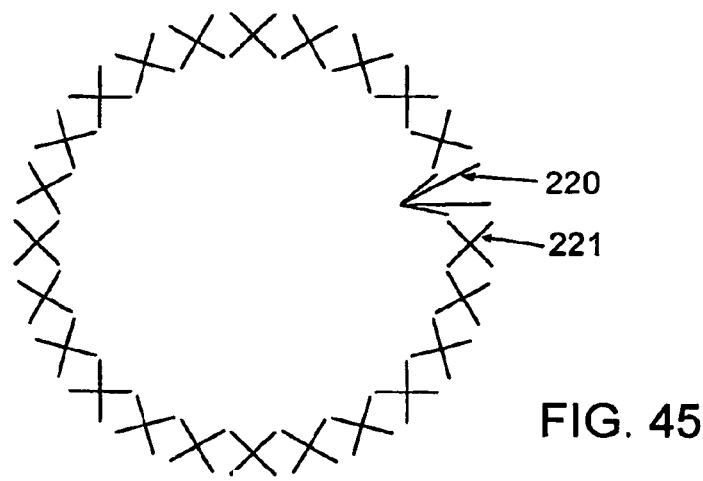
FIGS. 45 to 47 are similar to FIGS. 42 to 44, respectively, and show the case where the plasma discharge of the single one of the opening switches has progressed further toward the load at the central location with respect to the circular array.
Figure 46:
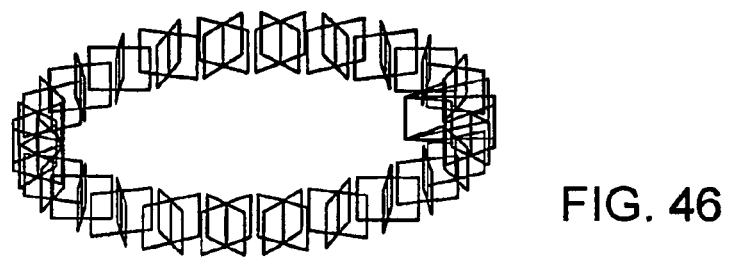
Figure 47:
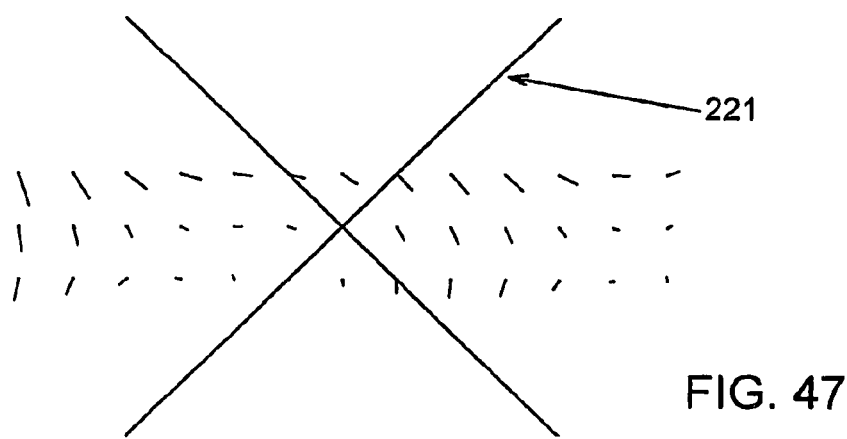

Further computer simulations show that the opening of one switch in the array may cause neighboring switches to open, so that the triggering of a single switch may cause the entire array to open. The array of opening switches will function as the dual of a Marx bank of closing switches. For example, FIG. 42 is a top view of a finite element model for a case where a single opening switch 215 in the circular array is in an open state. FIG. 43 is an oblique view of the finite element model of FIG. 42. FIG. 44 shows the magnetic field (scaled up by a factor of five) in the neighboring switch 216. The opening of the switch 215 has disrupted the magnetic field configuration for the neighboring switch 216. FIGS. 45 to 47 show that further opening of the switch 215 further disrupts the magnetic field configuration for the neighboring switch 216.

Figure 48:
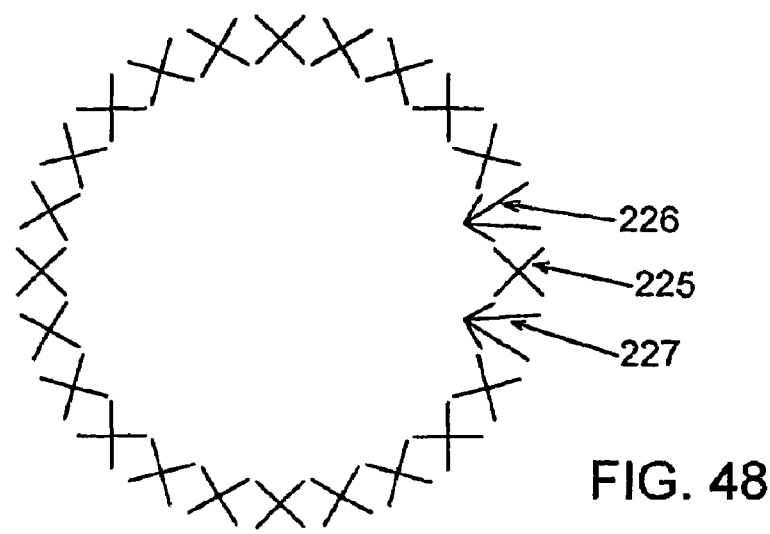
FIGS. 48 to 50 shows a case where an opening switch is in a closed state and neighboring opening switches in the circular array have been triggered into an opening state.
Figure 49:
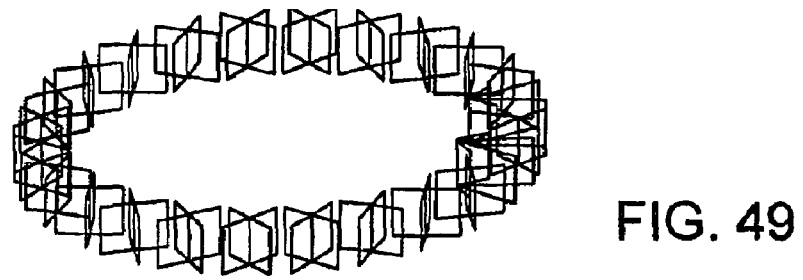
Figure 50:
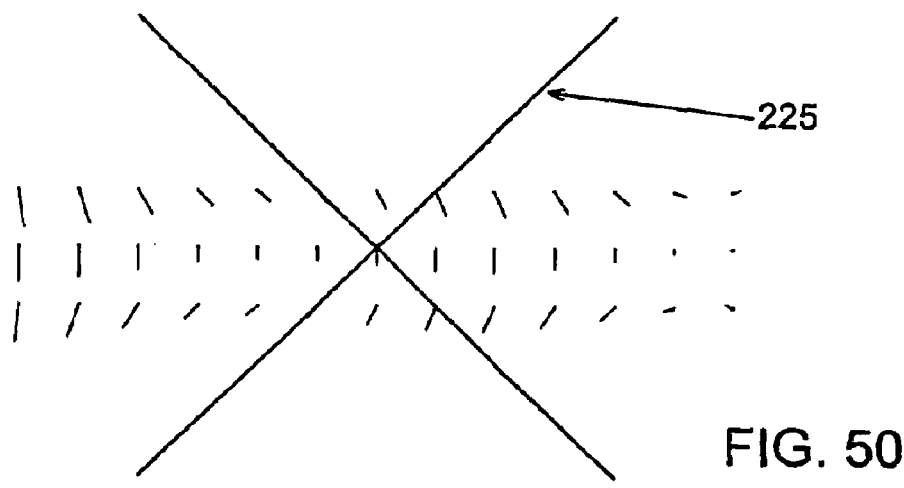

FIGS. 48 to 50 are similar to FIGS. 42 to 44, respectively, so that FIG. 50 shows the magnetic field for one of the opening switches when each of its two neighboring opening switches has been triggered into an opening state. From FIGS. 48 to 50 it appears that there is no need to trigger all of the switches in the array for fast opening of the entire array. Instead, including an even number of switches in the array and simultaneously triggering every other switch in the array can achieve fast opening of the entire array. At some expense of asymmetrical implosion, a fewer number of the switches could be triggered simultaneously. For example, in an array having thirty-six switches, every sixth switch in the array could be triggered simultaneously.

Figure 51:
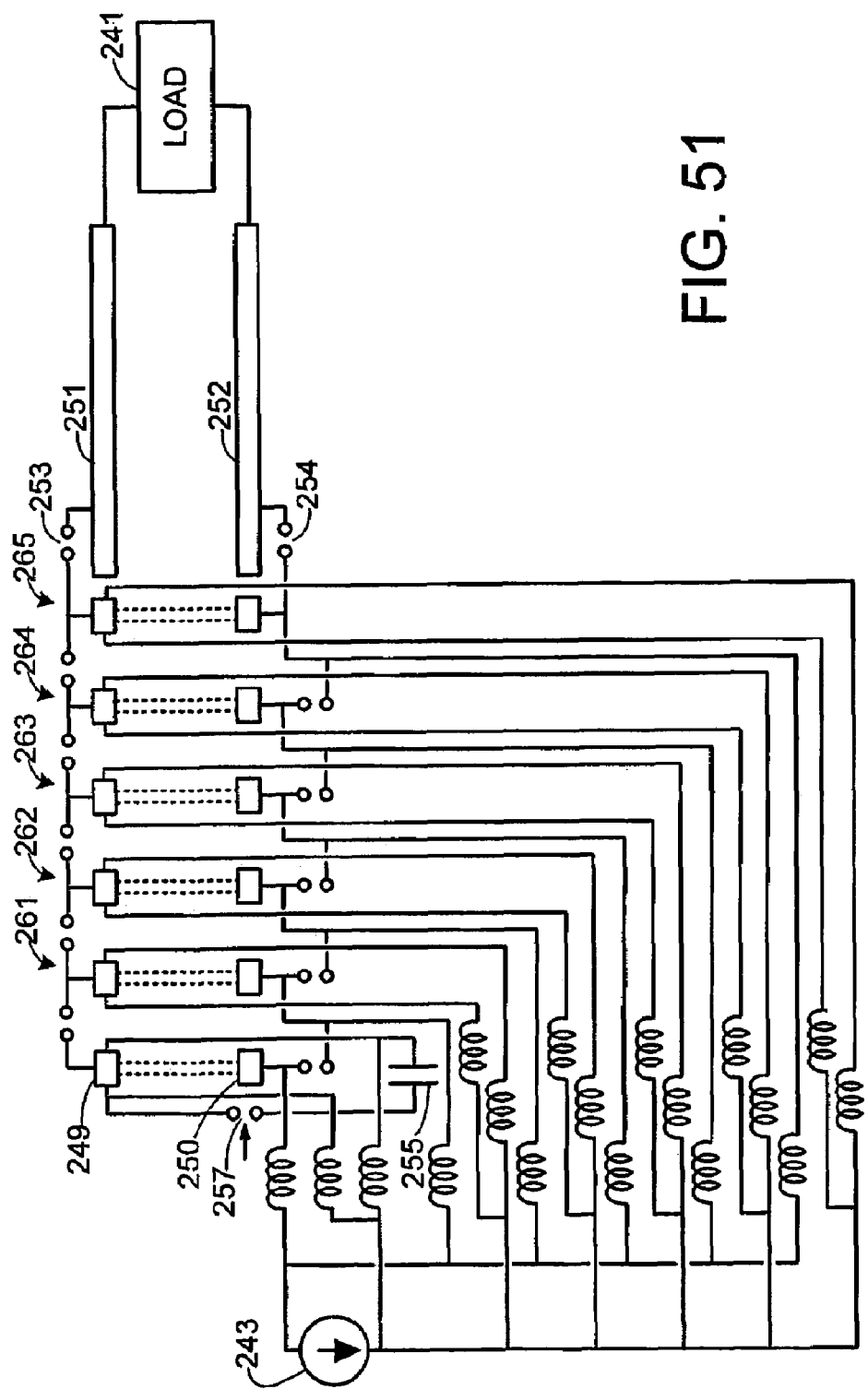
FIG. 51 shows a schematic diagram of a pulsed power system in accordance with another aspect of the present invention, in which a series of opening switches are cascaded so that the opening of a first one of the switches will cause the sequential opening of the other switches in the series and the build-up of a current pulse along a transmission line shared by the opening switches in the series.

FIG. 51 shows a schematic diagram of a pulsed power system in accordance with another aspect of the present invention, in which a series of plasma discharge elements are cascaded so that the opening of a first one of the switches will cause the sequential opening of the other switches in the series and a build-up of a current pulse along a transmission line shared by the plasma discharge elements in the series. For example, the pulsed power system in FIG. 51 includes a load 241, a current source 243, electrodes 249, 250 for producing a first discharge element, transmission line conductors 251, 252, isolation devices 253, 254, a capacitor 255, and a closing switch 257, which are similar to the respective elements 43, 49, 50, 51, 52, 53, 54, 55, and 57 in FIG. 3. The pulsed power system of FIG. 51 in addition includes a series of electrodes, conductors, and isolation devices (261, 262, 263, 264, 265) for supporting respective plasma discharge elements (shown in dashed lines) aligned along a direction from the first pair of electrodes 249, 250 towards the load 241. Due to the coupling by the isolation devices between the respective pairs of electrodes supporting the respective plasma discharge elements, opening of the first plasma discharge element (triggered by the closing of the switch 257) causes a sequential opening of the other plasma discharge elements in the array.

The plasma discharge elements can be cascaded in the fashion shown in FIG. 51 in order to reduce the size of the high-voltage capacitor 255 needed for triggering the series of the plasma discharge elements. The plasma discharge elements can also be cascaded in this fashion in order to reduce the amount of current that need be conducted by each plasma discharge element until the series of plasma discharge elements is triggered. The amount of current that need be conducted by plasma discharge element can be reduced in order to reduce the power loss and heat dissipation for each plasma discharge element. For example, the current conducted by each closed switch could be limited to no more than about 1 mega-ampere to promote discharge stability. The current density could be limited to permit the use of thermionic or field emitters for initiating and sustaining each plasma discharge element. This could permit the use of relatively low voltage current sources such as electrolytic capacitors and ultra-capacitors. For example, table-top pulsed power generators could use a number of capacitor modules, each including one or more electrolytic capacitors or a multiplicity of ultra-capacitors, a crowbar diode, and a silicon controlled rectifier for discharging current from the capacitors to one or more of the plasma discharge elements.

Figure 52:
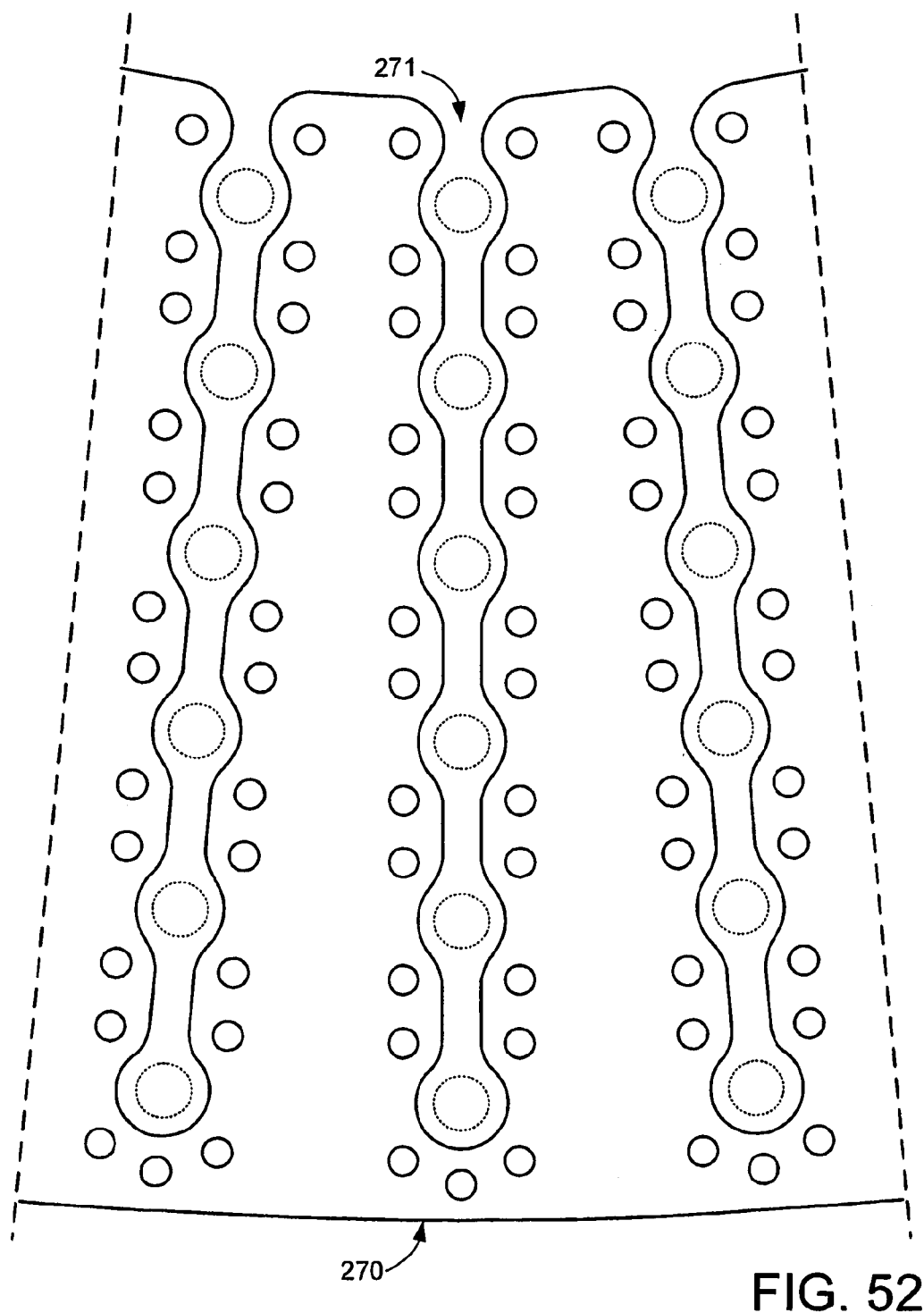
FIG. 52 shows a top view of an insulator plate having a series of radial channels, including a radial channel for receiving the series of opening switches shown in FIG. 51.

In practice, each plasma opening switch (e.g., 155, 156) shown in FIG. 22 could be replaced with an array of plasma discharge elements as shown in FIG. 51 in order to reduce the size of the high-voltage capacitors for triggering the opening switch array. For example, FIG. 52 shows a top view of an insulator plate 270 that could be used in such a pulsed power generator. The insulator plate 270 has a series of radial channels such as radial channel 271 for receiving the series of plasma discharges shown in FIG. 51. The insulator plate 270 could be cast from a ceramic cement composition, such as the CeraLith (Trademark) brand of inorganic polymer ceramic cement described in U.S. Pat. No. 5,766,337.

The invention claimed is:

1. A pulsed power system for supplying pulsed power to a load, the pulsed power system comprising an inductive energy storage circuit including a current source and a plasma opening switch, the plasma opening switch having a transmission line coupling the current source to the load for supplying current to the load, the transmission line extending away from a first region toward a second region near the load, the plasma opening switch having a closed state and an open state, the plasma opening switch changing from the closed state to the open state when a plasma discharge in the plasma opening switch is driven by magnetic force from the first region toward the second region;

wherein the pulsed power system includes electrical conductors arranged for providing a stabilizing magnetic field configuration in the first region to magnetically latch the plasma discharge in the first region during charging of the inductive energy storage circuit with current from the current source, and current flowing along the transmission line from the current source to the load tends to disrupt the stabilizing magnetic field configuration and unlatch the plasma discharge from the first region and drive the plasma discharge toward the second region;

wherein the electrical conductors arranged for providing the stabilizing magnetic field configuration are in the inductive energy storage circuit and carry current from the current source to the plasma discharge when the plasma discharge is in the first region and the plasma switch is in the closed state; and wherein the electrical conductors arranged for providing the stabilizing magnetic field configuration include at least one electrical conductor in a first current path for carrying a first current component tending to magnetically force the plasma discharge toward the second region when the plasma discharge is in the first region, and at least one electrical conductor in a second current path for carrying a second current component tending to magnetically force the plasma discharge away from the second region when the plasma discharge is in the first region.

2. The pulsed power system as claimed in claim 1, wherein the first region is magnetically insulated when the plasma opening switch is in the open state and conducting current from the current source to the load.

3. The pulsed power system as claimed in claim 1, wherein the stabilizing magnetic field configuration includes a multipole configuration of electrical conductor elements providing a local minimum of magnetic force upon the plasma discharge in the first region when the plasma opening switch is in the closed state.

4. The pulsed power system as claimed in claim 1, wherein the electrical conductors arranged for providing a stabilizing magnetic field configuration in the first region include a pair of parallel-spaced conductors disposed between the second region and the first region, the plasma discharge passing between the parallel-spaced conductors when the plasma opening switch changes from the closed state to the open state.

5. The pulsed power system as claimed in claim 1, wherein the inductive energy storage circuit is configured so that when the plasma opening switch is in the closed state and the inductive energy storage circuit becomes charged by the current source, the difference between the first current component and the second current component is an increasing function of time so that the stabilizing magnetic field configuration becomes destabilized for switching of the plasma opening switch from the closed state to the open state.

6. The pulsed power system as claimed in claim 5, wherein the current source includes at least one electromechanical generator and the first current path includes a first winding of the electromechanical generator and the second current path includes a second winding of the electromechanical generator.

7. The pulsed power system as claimed in claim 1, wherein the first current path has a first resistance and the second current path has a second resistance, and the second resistance is greater than the first resistance.

8. The pulsed power system as claimed in claim 1, which includes a trigger pulse generator coupled to at least one of the first and second current paths for applying a trigger pulse to increase the difference between the first current component and the second current component to destabilize the stabilizing magnetic field configuration and thereby switch the plasma opening switch from the closed state to the open state.

9. The pulsed power system as claimed in claim 8, wherein the trigger pulse generator includes a capacitor and a closing switch coupled to the capacitor for applying the trigger pulse by closing the closing switch to discharge the capacitor into the inductive energy storage circuit.

10. The pulsed power system as claimed in claim 8, wherein the plasma opening switch includes at least one pair of spaced electrodes in the first region for supplying current to the plasma discharge when the plasma discharge is in the first region, and at least one isolation device connecting at least one of the electrodes to the transmission line, the isolation device having a relatively high resistance when the plasma discharge is in the first region and the plasma opening switch is in the closed state, and the isolation device having a relatively low resistance when the plasma opening switch is in the open state.

11. The pulsed power system as claimed in claim 10, wherein the isolation device includes a closing switch.

12. The pulsed power system as claimed in claim 10, wherein the isolation device includes a varistor.

13. The pulsed power system as claimed in claim 10, wherein the isolation device has a relatively low incremental resistance for an applied voltage in excess of a threshold voltage, the threshold voltage being greater than a voltage required for sustaining the plasma discharge across the spaced electrodes in the first region when the plasma switch is in the closed state.

14. The pulsed power system as claimed in claim 1, which includes means for initiating the plasma discharge in the first region.

15. The pulsed power system as claimed in claim 1, wherein the first region is annular and the plasma discharge in the first region includes an array of plasma discharge elements.

16. The pulsed power system as claimed in claim 15, wherein the plasma opening switch includes an annular insulator structure comprised of solid dielectric material in the neighborhood of the first region, the annular insulator structure having an array of slots including a respective slot for containing each of the plasma discharge elements.

17. The pulsed power system as claimed in claim 16, wherein the plasma opening switch includes an array of electrical conductor elements disposed in the solid dielectric material between the first region and the second region for producing a magnetic force on the discharge elements tending to push the plasma discharge elements away from the second region, each of the electrical conductor elements being disposed in the solid dielectric material between a pair of neighboring ones of the slots.

18. The pulsed power system as claimed in claim 1, wherein the plasma discharge in the first region includes at least one array of plasma discharge elements, the plasma discharge elements in said at least one array including a first plasma discharge element furthest from the second region and a last plasma discharge closest to the second region, the plasma discharge elements in said at least one array being coupled to each other so that opening of the first plasma discharge element causes a sequential opening of the other plasma discharge elements in said at least one array.

19. The pulsed power system as claimed in claim 1, wherein the transmission line is a component of a plasma flow switch.

20. The pulsed power system as claimed in claim 1, wherein the transmission line is a component of a plasma focus device.

21. The pulsed power system as claimed in claim 1, wherein the transmission line is a component of a spheromac device.

22. The pulsed power system as claimed in claim 1, wherein the current source is a compensated alternator.

23. The pulsed power system as claimed in claim 1, wherein the current source is an explosively-driven magnetic flux compressor.

* * * * *

UNITED STATES PATENT AND TRADEMARK OFFICE
CERTIFICATE OF CORRECTION

PATENT NO. : 7,634,042 B2 Page 1 of 1
APPLICATION NO. : 10/599251
DATED : December 15, 2009
INVENTOR(S) : Auchterlonie It is certified that error appears in the above-identified patent and that said Letters Patent is hereby corrected as shown below:

On the Cover page, (*) Notice: Subject to any disclaimer, the term of this patent is extended or adjusted under 35 USC 154(b) by 623 days.

Delete the phrase "by 623 days" and insert -- by 707 days --.

Signed and Sealed this

Twenty-fourth Day of August, 2010

David J. Kappos
*Director of the United States Patent and Trademark Office*